US012791791B2

(12) United States Patent
Okada et al.

(10) Patent No.: US 12,791,791 B2
(45) Date of Patent: Nov. 10, 2026

(54) OPTICAL CIRCUIT, OPTICAL SENSOR, AND MOBILE BODY USING THE OPTICAL CIRCUIT

(71) Applicant: NICHIA CORPORATION, Anan (JP)

(72) Inventors: Masanori Okada, Yokohama (JP); Hisashi Ogawa, Yokohama (JP)

(73) Assignee: NICHIA CORPORATION, Anan (JP)

( * ) Notice: Subject to any disclaimer, the term of this patent is extended or adjusted under 35 U.S.C. 154(b) by 273 days.

(21) Appl. No.: 18/714,074

(22) PCT Filed: Nov. 24, 2022

(86) PCT No.: PCT/JP2022/043379
§ 371 (c)(1),
(2) Date: May 28, 2024

(87) PCT Pub. No.: WO2023/100742
PCT Pub. Date: Jun. 8, 2023

(65) Prior Publication Data
US 2025/0035842 A1 Jan. 30, 2025

(30) Foreign Application Priority Data
Nov. 30, 2021 (JP) ................................ 2021-194775

(51) Int. Cl.
*G02B 6/293* (2006.01)
*G02B 6/125* (2006.01)
*G02B 6/12* (2006.01)

(52) U.S. Cl.
CPC ......... *G02B 6/125* (2013.01); *G02B 6/29338* (2013.01); *G02B 2006/12097* (2013.01)

(58) Field of Classification Search
CPC ........... G02B 6/29335; G02B 6/29332; G02B 6/29338
See application file for complete search history.

(56) References Cited

U.S. PATENT DOCUMENTS 6,553,158 B1 * 4/2003 Jimenez ............ G02B 6/29338 385/39
7,400,797 B2 * 7/2008 Bhagavatula ...... G02B 6/29335 385/32
7,444,045 B2 * 10/2008 Fan ......................... G02B 6/26 385/27
(Continued)

FOREIGN PATENT DOCUMENTS

JP 2008-516285 A 5/2008

OTHER PUBLICATIONS

International Search Report and Written Opinion of the International Searching Authority with English language translations issued in the corresponding International Patent Application No. PCT/JP2022/043379, dated Feb. 7, 2023.

*Primary Examiner* — Eric Wong
(74) *Attorney, Agent, or Firm* — Foley & Lardner LLP

(57) ABSTRACT

An optical circuit includes a resonator and an optical waveguide that includes a ridge formed upon substrate or a semiconductor layer. The resonator has a light circulating surface and is disposed such that part of the light circulating surface faces the upper surface of the ridge, across a first gap. The distance between part of the light circulating surface and the upper surface of the ridge facing the part of the light circulating surface is shorter than the distance that an evanescent wave protrudes.

15 Claims, 17 Drawing Sheets

(56) References Cited

U.S. PATENT DOCUMENTS

| | | | | |
|---|---|---|---|---|
| 10,830,954 | B1 | 11/2020 | Levy et al. | |
| 11,722,120 | B1 * | 8/2023 | Wood | B81B 3/0027 331/155 |
| 2003/0206693 | A1 * | 11/2003 | Tapalian | G01P 15/093 385/28 |
| 2005/0077513 | A1 * | 4/2005 | Fan | G01N 21/7746 257/45 |
| 2006/0072875 | A1 | 4/2006 | Bhagavatula et al. | |
| 2017/0219427 | A1 | 8/2017 | Ma et al. | |
| 2020/0400888 | A1 * | 12/2020 | Levy | G01S 17/89 |

* cited by examiner

OPTICAL CIRCUIT, OPTICAL SENSOR, AND MOBILE BODY USING THE OPTICAL CIRCUIT

CROSS-REFERENCE TO RELATED APPLICATIONS

This application is a national stage of PCT Application No. PCT/JP2022/043379, filed on Nov. 24, 2022, which claims priority to Japanese Application No. 2021-194775, filed on Nov. 30, 2021.

TECHNICAL FIELD

The present disclosure relates to an optical circuit, and an optical sensor and a mobile body using the optical circuit.

BACKGROUND

A Photonic Integrated Circuit (PIC) is a circuit in which optical elements, such as an optical switch, a wave filter, or the like, are embedded in a substrate, and is generally manufactured using a technique called semiconductor microfabrication. The wave filter is preferably composed of an optical resonator having a high quality factor. A whispering-gallery-mode (WGM) resonator that is fabricated by grinding and polishing an optical materials can achieve a higher quality factor than the general resonator manufactured by the semiconductor microfabrication. A Light Detection and Ranging (LiDAR) sensor in which the WGM resonator is coupled to an optical waveguide by an evanescent wave is known (refer to Patent Document 1, for example).

Patent Document 1: United States Patent Application Publication No. 2020/0400888

SUMMARY

In a case where the resonator and the optical waveguide are optically coupled by utilizing the evanescent wave, the distance between the resonator and the optical waveguide needs to be accurately controlled. In Patent Document 1, the WGM resonator is fixed, via an adhesive, to a thin cladding layer covering the optical waveguide. It is difficult to accurately control a thickness the adhesive, and further, the adhesive is sensitive to temperature changes.

Accordingly, one object of the present invention is to provide an optical circuit in which a resonator and an optical waveguide can be stably optically coupled, and an optical sensor and a mobile body using the optical circuit.

In one embodiment, an optical circuit includes an optical waveguide including a ridge, the optical waveguide formed on a substrate or a semiconductor layer, and a resonator, wherein

- the resonator has a light circulating surface, and is disposed such that a part of the light circulating surface faces an upper surface of the ridge with a first gap interposed therebetween, and
- a distance between the part of the light circulating surface and the upper surface of the ridge facing the part of the light circulating surface is shorter than a distance at which an evanescent wave leaks.

Further, in one embodiment, an optical circuit includes an optical waveguide including a ridge, the optical waveguide formed on a substrate or a semiconductor layer, and a resonator, wherein

- the resonator is a whispering gallery mode resonator, and

- the resonator has a light circulating surface, and is disposed such that a part of the light circulating surface faces an upper surface of the ridge with a first gap interposed therebetween.

It is possible to provide an optical circuit in which a resonator and an optical waveguide can be stably optically coupled.

DETAILED DESCRIPTION

Figure 1A:
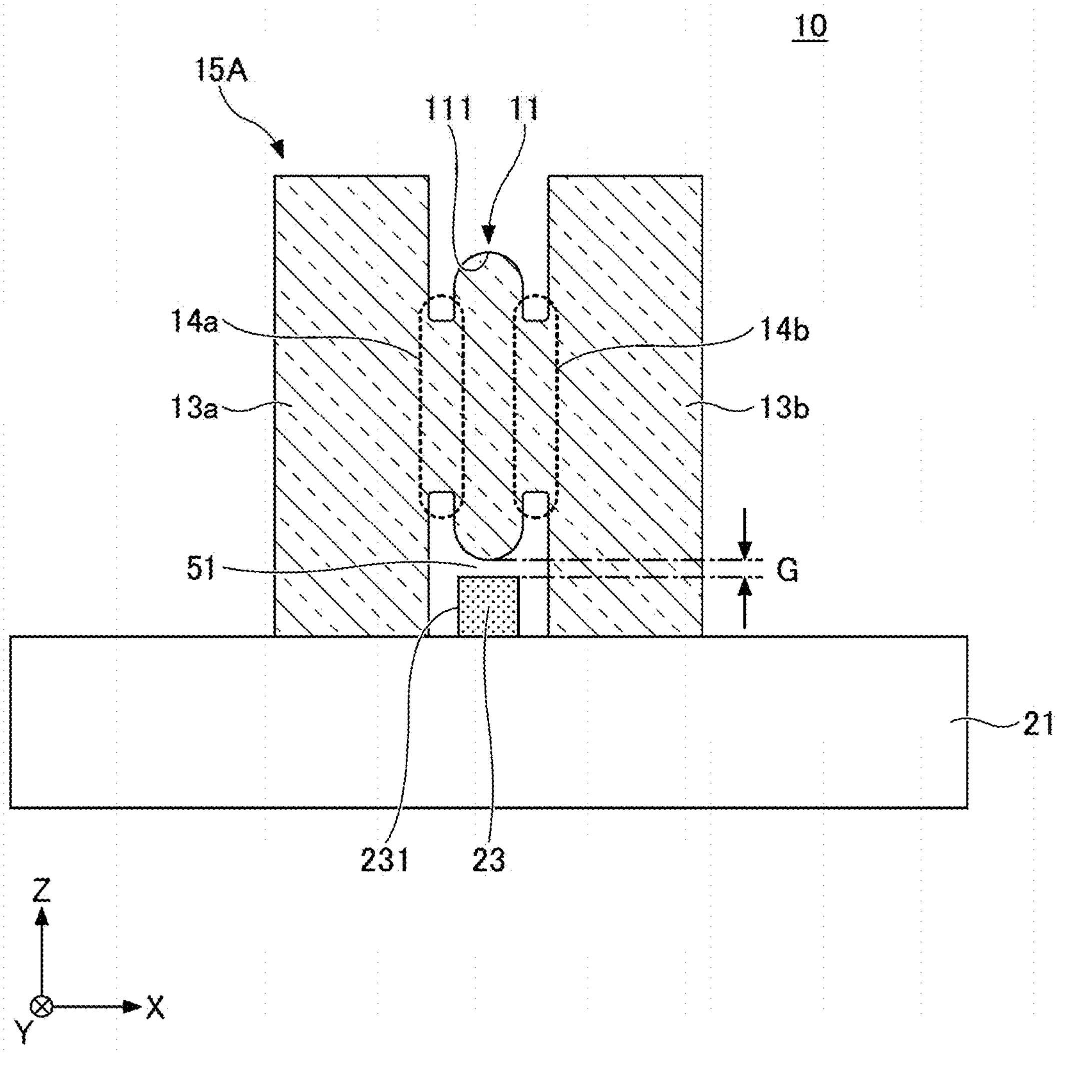
FIG. 1A is a schematic diagram of an optical circuit according to an embodiment in a waveguide direction.

Hereinafter, embodiments for implementing the present disclosure will be described with reference to the drawings. The following description is intended to embody the technical idea of the present disclosure, and the present disclosure is not limited to that of the following description unless otherwise indicated.

In the drawings, members having the same function may be designated by the same reference numerals. By taking into consideration the ease of explaining or understanding the main points, the embodiments may be illustrated separately for the sake of convenience, but partial replacement or combination of configurations illustrated in different embodiments or exemplary implementations is possible. In the latter embodiments, matters different from the former embodiments will mainly be described. Further, the description of matters common among the embodiments may be omitted. The size, positional relationships, or the like of members illustrated in the drawings may be exaggerated for the clarity of the description.

Hereinafter, each of the embodiments will be described with reference to the drawings.

First Embodiment

The embodiment provides a configuration in which a gap between an upper surface of a ridge of an optical waveguide and a resonator is controlled, so as to stably couple light passing through the optical waveguide to the resonator.

Figure 1B:
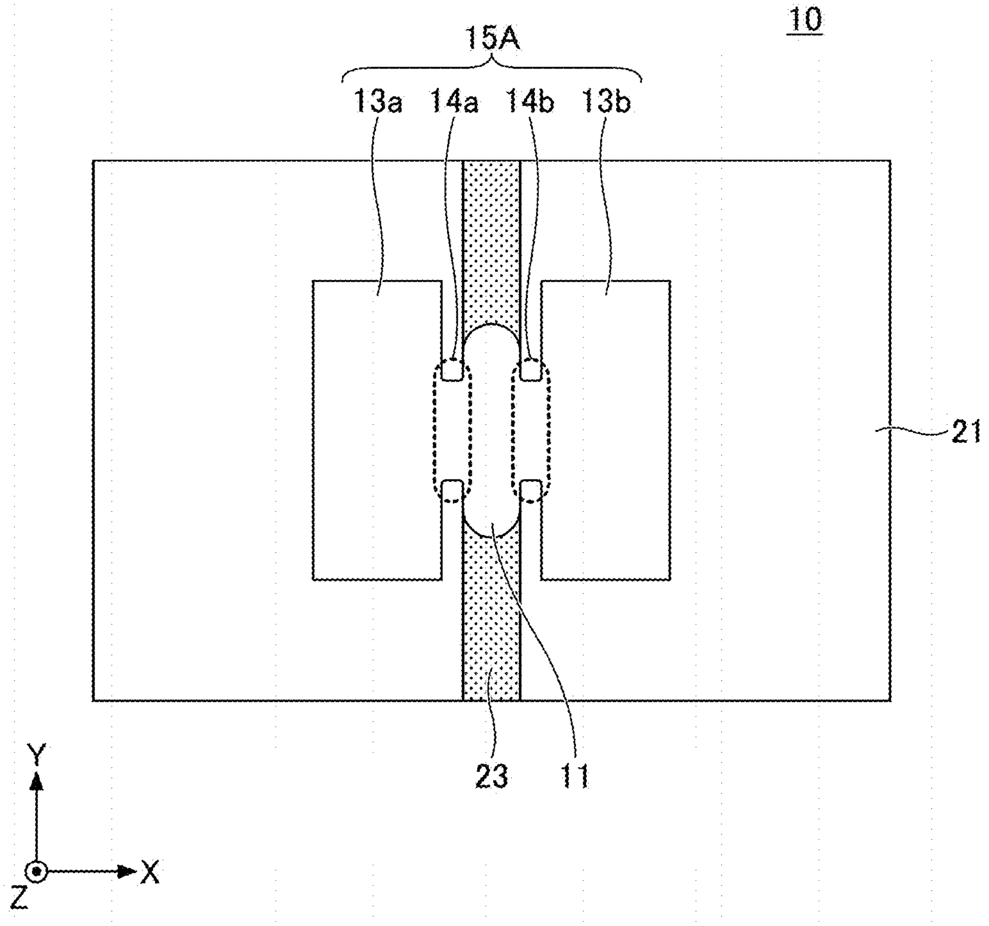
FIG. 1B is a top view of the optical circuit according to the embodiment.

FIG. 1A and FIG. 1B illustrate a configuration example of an optical circuit 10 according to the embodiment. FIG. 1A is a schematic diagram of the optical circuit 10 in a waveguide direction, and FIG. 1B is a top view of the optical circuit 10. As a coordinate system, a plane parallel to a substrate or semiconductor layer 21 is an X-Y plane, and a normal direction to the substrate or semiconductor layer 21 is a Z direction. An optical axis direction of an optical waveguide is defined as a Y direction (which may either be a +Y direction or a −Y direction).

In the embodiment, the optical circuit 10 includes an optical waveguide 23 formed on the substrate or semiconductor layer 21 (hereinafter, simply referred to as the "substrate 21 or the like") and including a ridge, and a resonator 11. The resonator 11 has a light circulating surface 111, and a part of the light circulating surface 111 is disposed to face an upper surface of the ridge 231 via a first gap 51. That is, the optical circuit 10 has the first gap 51 between the resonator 11 and the optical waveguide 23, and the resonator 11 and the optical waveguide 23 are separated from each other. The first gap 51 represents a gap at a position where the resonator 11 and the optical waveguide 23 are closest to each other. More particularly, the first gap 51 is a gap at a position where the light circulating surface 111 and the ridge 231 are closest to each other. A distance G between a part of the light circulating surface 111 and the upper surface of the ridge 231 facing the light circulating surface 111 is shorter than a distance at which an evanescent wave leaks.

An extent of the optical coupling between the optical waveguide 23 and the resonator 11 is mainly determined by a wavelength of light, a refractive index of a material, and the distance G between the optical waveguide 23 and the resonator 11. In the embodiment, the distance G is accurately controlled by a machining accuracy of the optical waveguide 23 and the resonator 11. This distance G can be approximately the wavelength of light, and more particularly, it suffices that this distance is shorter than the distance at which the evanescent wave leaks. Accordingly, it is possible to optically couple the optical waveguide 23 and the resonator 11. A material, such as an adhesive or the like, for connecting the part of the light circulating surface 111 and the upper surface of the ridge 231, is not interposed between the first gap 51.

Alternatively, in the embodiment, the optical circuit 10 includes the optical waveguide 23 including the ridge 231 formed on the substrate 21 or the like, and the resonator 11. The resonator 11 is a WGM resonator, and the resonator has the light circulating surface 111, and is arranged such that a part of the light circulating surface faces the upper surface of the ridge 231 of the optical waveguide 23 via the first gap 51.

The resonator 11 is a WGM resonator capable of confining light along the light circulating surface 111. The light circulates along the light circulating surface 111 while being totally reflected, and is confined in the resonator 11. The resonator 11 functions as a filter having a high quality factor in which light having a specific wavelength determined by a circumferential length of the light circulating surface 111 and an effective refractive index resonates. By forming the light circulating surface 111 into a smooth surface, the resonator 11 with a small scattering loss and high sensitivity can be obtained. A surface roughness (Ra) of the light circulating surface 111 is 10 nm or less, for example.

In the optical circuit 10, the resonator 11 is held above the optical waveguide 23 by the support 15A via the first gaps 51. Because no material, such as an adhesive or the like, is interposed between the light circulating surface 111 and the upper surface of the ridge 231, the distance G between the light circulating surface 111 and the upper surface of the ridge 231 is less likely to vary by a temperature change, vibration, or the like. Accordingly, the optical waveguide 23 and the resonator 11 can be optically coupled in a stable manner. The support 15A is fixed to the upper surface of the substrate 21 or the like at a position separated from the ridge 231. For example, the support 15A is fixed to the substrate 21 or the like at a position separated from the optical waveguide 23 or the ridge 231 in a direction different from the optical axis of the optical waveguide 23 (in this example, the ±X direction) in the X-Y plane.

Figure 1C:
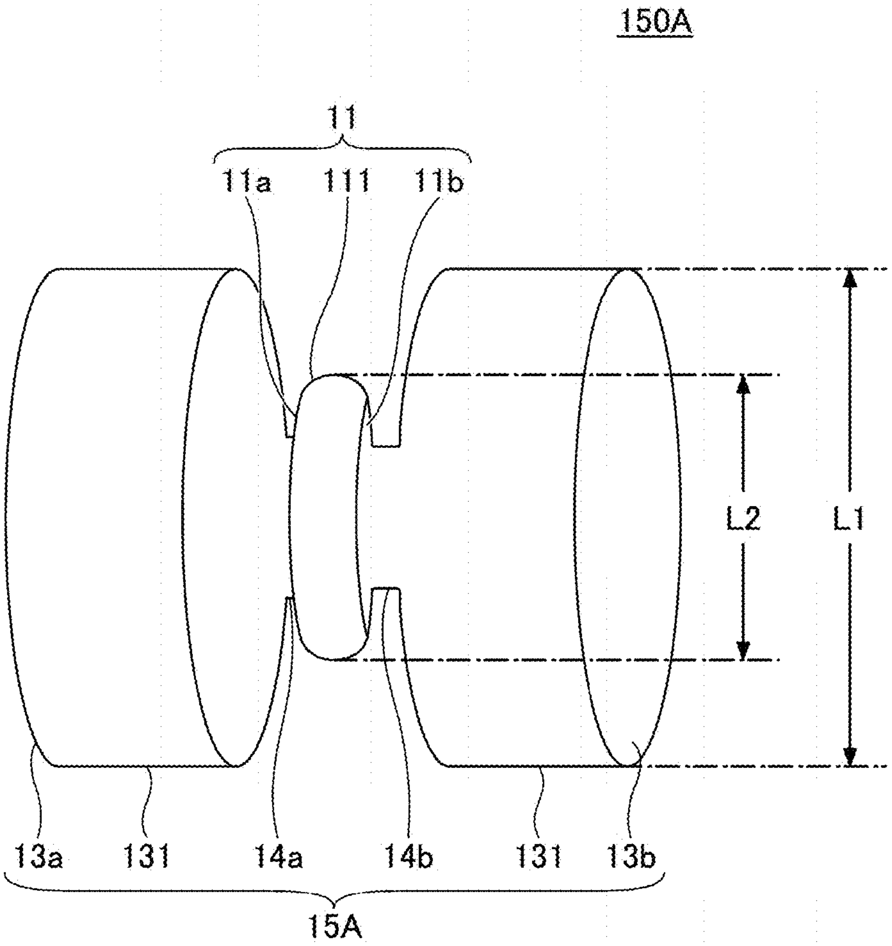
FIG. 1C is a perspective view of a resonator structure body including a resonator and a support.

FIG. 1C is a perspective view of a resonator structure body 150A including the resonator 11 and the support 15A. The support 15A includes a first support portion 13*a* and a second support portion 13*b*, which are located on both sides of the resonator 11. The first support portion 13*a* supports a first surface 11*a* of the resonator 11 via a first connecting portion 14*a*. The second support portion 13*b* supports a second surface 11*b* of the resonator 11, opposite to the first surface 11*a*, via a second connecting portion 14*b*. As illustrated in FIG. 1A and FIG. 1B, the first support portion 13*a* and the second support portion 13*b* are fixed on the substrate 21 or the like on both sides of the ridge 231. Hence, the resonator 11 can be stably supported by the support 15A.

Moreover, in the normal direction to the substrate 21 or the like, a maximum length L1 of the first support portion 13*a* and the second support portion 13*b* is greater than a maximum length L2 of the resonator 11.

In the example of FIG. 1C, the first support portion 13*a* and the second support portion 13*b* have a circular column shape, and are fixed to the substrate 21 or the like at a lateral surface 131 of the circular column, but the present invention is not limited to this example. The first support portion 13*a* and the second support portion 13*b* may be a polygonal column, such as a rectangular column, a hexagonal column, and an octagonal column, or the like, as long as the resonator 11 can be supported. In this case, a diameter or the maximum length L1 of the first support portion 13*a* and the second support portion 13*b* is greater than a diameter or the maximum length L2 of the resonator 11, and the resonator 11 is held above the optical waveguide 23 at the predetermined distance G. The diameter or the maximum length L1 of the first support portion 13*a* and the second support portion 13*b* may be 0.05 mm or more and 50 mm or less, and preferably 0.05 mm or more and 10 mm or less, for example. The diameter or the maximum length of the resonator 11 may be 0.999 mm or more and 9.999 mm or less. A width of the resonator 11 may be 1 μm or more and 100 μm or less, and preferably 10 μm or more and 50 μm or less, for example. In the present specification, the polygonal column includes a state where a process such as chamfering or beveling is performed on a portion thereof.

Figure 2A:
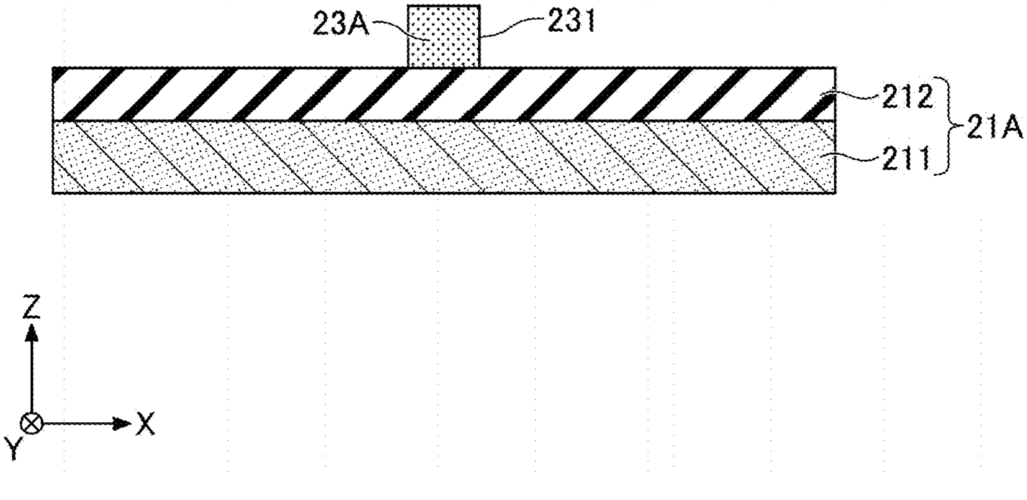
FIG. 2A is a diagram illustrating a configuration example of an optical waveguide including a ridge.
Figure 2B:
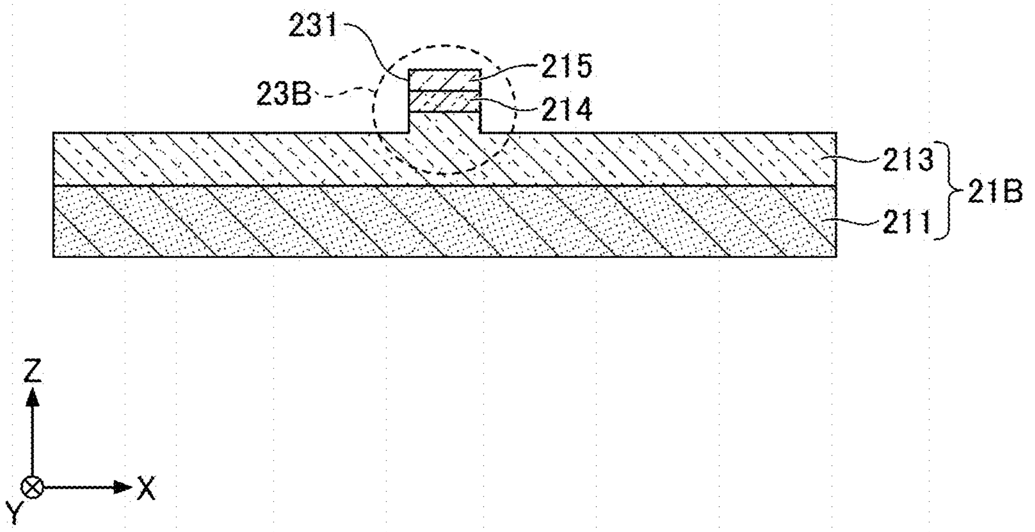
FIG. 2B is a diagram illustrating another configuration example of the optical waveguide including the ridge.

FIG. 2A and FIG. 2B illustrate configuration examples of the optical waveguide 23 including the ridge 231, as an optical waveguide 23A and an optical waveguide 23B. In FIG. 2A, a substrate 21A is a substrate 211 having an insulating layer 212. The insulating layer 212 is a silicon oxide film, for example, and the optical waveguide 23A including the ridge 231 is formed on the insulating layer 212.

The optical waveguide 23A is formed of a material having a refractive index higher than that of the insulating layer 212. Because the upper surface and both lateral surfaces of the ridge 231 are surrounded by air, light is confined in the ridge 231 and propagates in the Y direction. In a case where a Silicon On Insulator (SOI) substrate is used as the substrate 21A, a silicon substrate of the SOI substrate may be used as the substrate 211, a silicon oxide film of the SOI substrate may be used as the insulating layer 212, and the optical waveguide 23A may be formed by the silicon layer of the SOI substrate. Alternatively, the ridge 231 may be formed of a silicon oxide film to use the ridge 231 as the optical waveguide 23A. A silicon waveguide may be used when the light to be used is infrared light, and a silicon oxide waveguide or the like may be used when the light to be used is visible light.

In FIG. 2B, a substrate 21B includes a substrate 211, and an n-side semiconductor layer 213 formed on the substrate 211. The optical waveguide 23B includes a portion of the n-side semiconductor layer 213, a p-side semiconductor layer 215, and an active layer 214 between the n-side semiconductor layer 213 and the p-side semiconductor layer 215. The n-side semiconductor layer 213 includes an n-side cladding layer and an n-side optical guide layer, and includes at least one or more n-type semiconductor layers. A portion protruding from the n-side semiconductor layer 213 forms the ridge 231. The p-side semiconductor layer 215 includes a p-side optical guide layer and a p-side cladding layer, and includes at least one or more p-type semiconductor layers. A p-side contact layer may further be provided on the p-side cladding layer. The active layer 214 may be a multi-quantum well layer including a plurality of barrier layers and well layers.

The active layer 214 is interposed between the n-side cladding layer and the p-side cladding layer having a refractive index lower than that of the active layer 214 in a layered direction (Z direction), so that the light is confined therebetween. In a lateral direction (X direction), the active layer 214 is partitioned by the width of the ridge 231 of the p-side semiconductor layer 215. Accordingly, a region including the active layer 214 determined by the width of the ridge 231 serves as the optical waveguide 23B. That is, the ridge 231 includes a portion of the n-side semiconductor layer 213, the active layer 214, and the p-side semiconductor layer 215. The portion of the n-side semiconductor layer 213 included in the ridge 231 preferably includes an n-side cladding layer and an n-side optical guide layer. In this case, it is possible to efficiently confine the light in the waveguide, and reduce the loss of light. The material used for the n-side semiconductor layer 213, the active layer 214, and the p-side semiconductor layer 215 may be a compound semiconductor, such as a GaN-based semiconductor, an InP-based semiconductor, a GaAs-based semiconductor, or the like. These materials may be two-element based, three-element based, and four-element based materials. The width of the ridge 231 may be 0.3 μm or more and 50 μm or less, for example. The material used for the substrate 211 may be sapphire, GaN, GaAs, or the like, for example.

Figure 3:
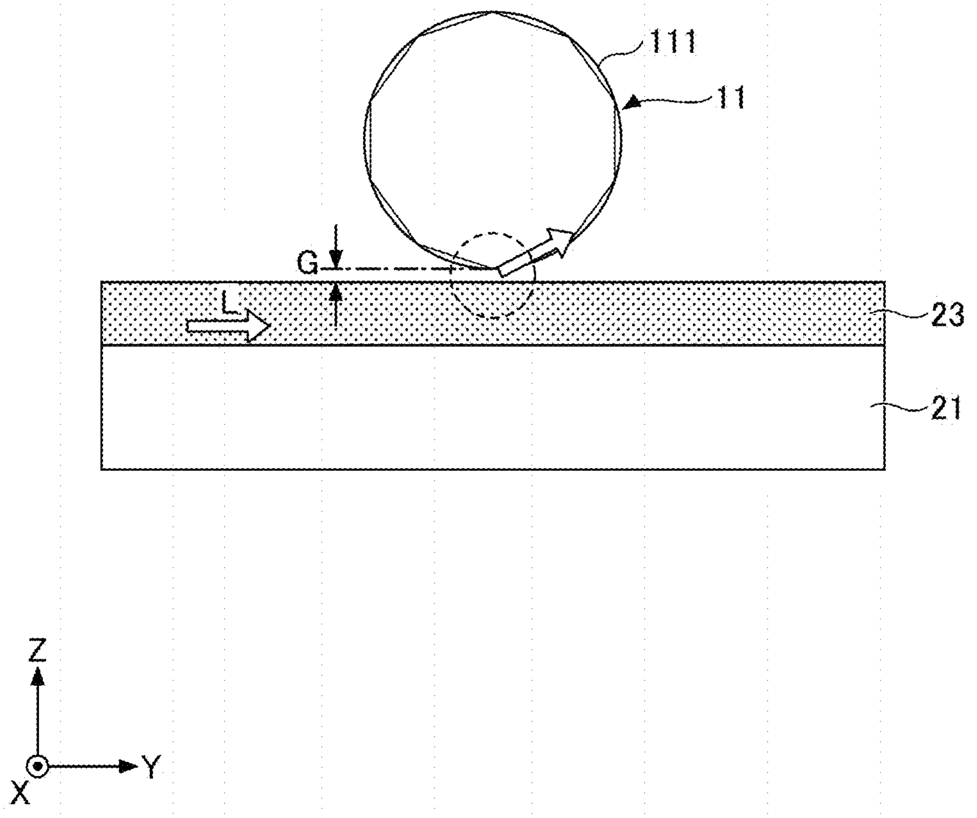
FIG. 3 is a diagram illustrating an optical coupling between the optical waveguide and the resonator.

FIG. 3 is a diagram illustrating an optical coupling between the optical waveguide 23 and the resonator 11. The light L indicated by a thick arrow propagates through the optical waveguide 23 in the optical axis direction (Y direction in FIG. 3) of the optical waveguide 23. The light L propagates through the optical waveguide 23 while being totally reflected. In the process of this total reflection, the light slightly leaks from the optical waveguide 23 toward the first gap 51. The light leaking toward the gap is called an evanescent wave. A distance over which the evanescent wave leaks corresponds to the order of length of the wavelength. The distance over which the evanescent wave leaks is 700 nm or less, 500 nm or less, 300 nm or less, or 100 nm or less, for example.

The resonator 11 is provided above the optical waveguide 23, so as to be positioned at a height that is the distance G from the upper surface of the ridge 231 (refer to FIG. 1A) of the optical waveguide 23. The distance G is shorter than the distance over which the evanescent wave leaks. Accordingly, the optical waveguide 23 and the resonator 11 are optically coupled, and a portion of the light L circulates along the light circulating surface 111 while being totally reflected. The light circulating along the light circulating surface 111 while being totally reflected slightly leaks from the light circulating surface 111 toward the first gap 51. Because the resonator 11 and the optical waveguide 23 are optically coupled, a portion of the light circulating along the light circulating surface 111 while being totally reflected propagates in the optical axis direction (Y direction) in the optical waveguide 23.

Due to the light circulating in the resonator 11, the light having the specific wavelength determined by the circumferential length of the light circulating surface 111 and the effective refractive index resonates. In an optical sensor which will be described later, the optical sensor can be utilized as a gyro sensor by detecting the resonance frequency of the resonator 11 from the output light of the optical circuit 10.

Figure 4A:
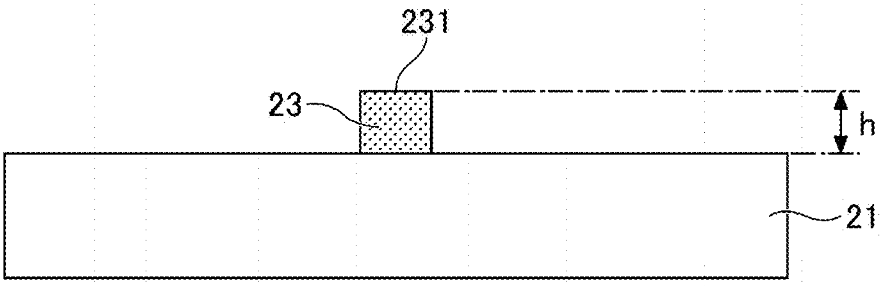
FIG. 4A is a diagram illustrating a height control of the optical waveguide.
Figure 4B:
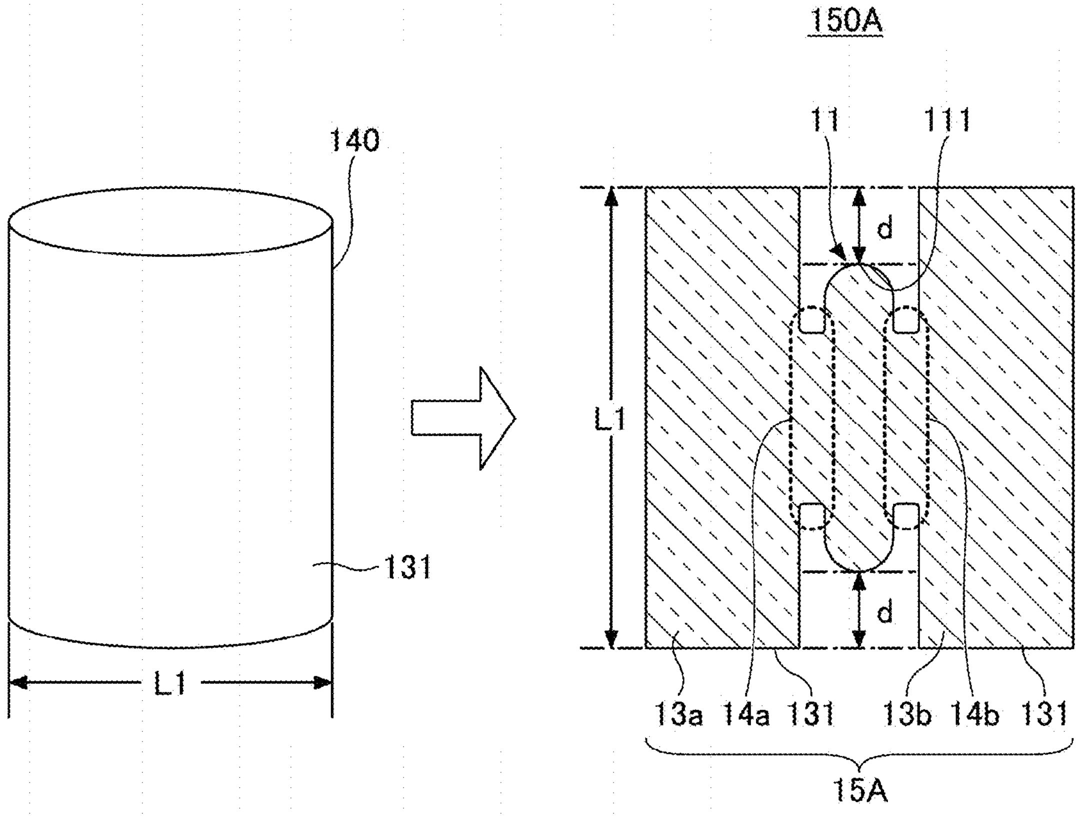
FIG. 4B is a diagram illustrating a machining control of the resonator.
Figure 4C:
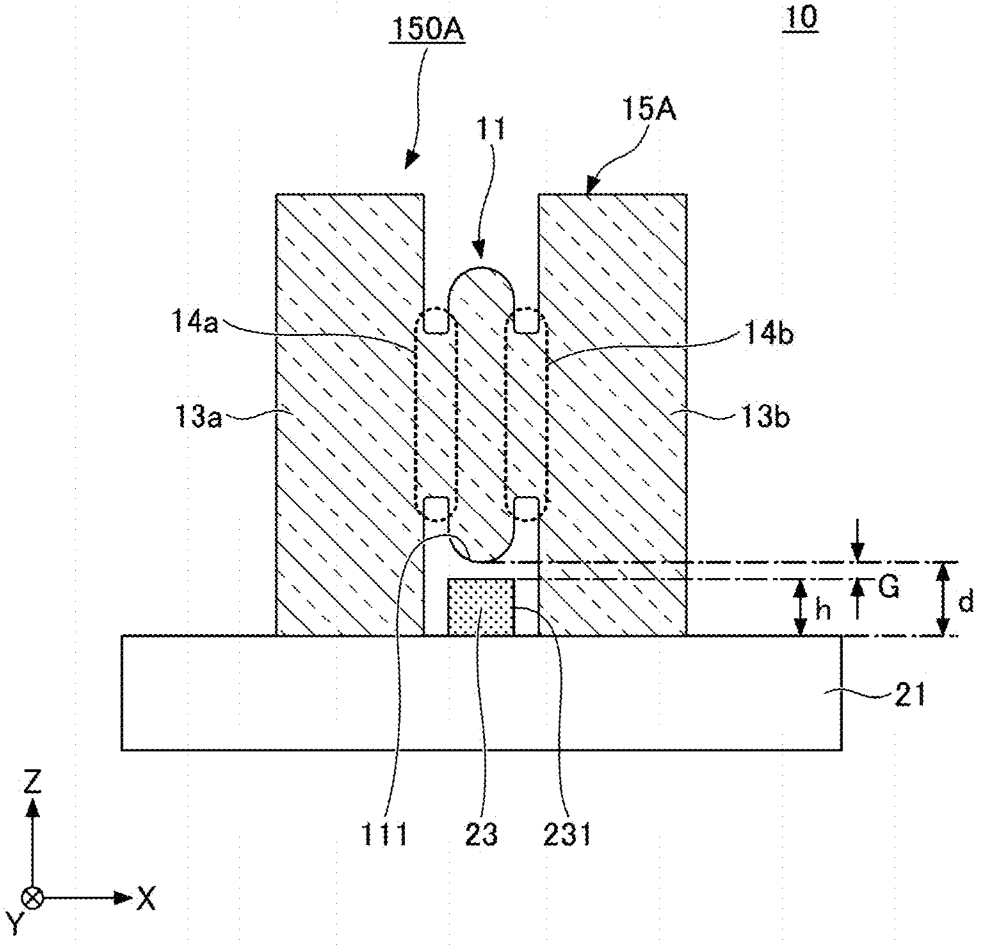
FIG. 4C is a diagram illustrating an installation of the resonator with respect to the optical waveguide.

FIG. 4A is a diagram illustrating a height control of the optical waveguide 23. FIG. 4B is a diagram illustrating a machining control of the resonator 11. FIG. 4C is a diagram illustrating an installation of the resonator 11 with respect to the optical waveguide 23. In order to achieve a stable optical coupling by accurately controlling the distance G between the optical waveguide 23 and the light circulating surface 111 of the resonator 11, it is important to control a height h of the ridge 231 of the optical waveguide 23 and the position of the light circulating surface 111 of the resonator 11.

As illustrated in FIG. 4A, the accuracy of the height h of the ridge 231 of the optical waveguide 23 is determined by an accuracy of the semiconductor microfabrication. For example, the height h of the ridge 231 can be controlled with a high accuracy, by forming a thin film of a material that forms the optical waveguide 23 on the substrate 21 or the like, and controlling an amount of etching of the thin film. Alternatively, the n-side semiconductor layer 213, the active layer 214, and the p-side semiconductor layer 215 are layered on the substrate, and the amount of etching of the semiconductor layers may be controlled, so as to control the height h of the ridge 231 with a high accuracy. The height h of the ridge 231 is 300 nm or more and 3000 nm or less, and preferably 500 nm or more and 2000 nm or less, for example.

The optical waveguide 23 may be formed of any material, as long as the material transmits light to be used, and has a refractive index higher than that of a surrounding medium. For example, a group III-V compound semiconductor, such as a GaN-based semiconductor, a InP-based semiconductor, a GaAs-based semiconductor, or the like may be used for the optical waveguide material. Alternatively, the optical waveguides 23 may be formed of Si, SiN, $SiO_2$, $LiNbO_3$, or the like.

As illustrated in FIG. 4B, the resonator 11 may be formed monolithically with the support 15A using a material 140 that is a circular column, a polygonal column, or the like. In this example, the material 140 is a crystal having a circular column shape, such as glass, fluoride, oxide, or the like. Magnesium fluoride ($MgF_2$), calcium fluoride ($CaF_2$), strontium fluoride ($SrF_2$), yttrium-lithium fluoride ($LiYF_4$), or the like can be used as the fluoride crystal. These materials have a high transmittance with respect to a wide range of wavelengths from visible light to infrared light, and hardly cause optical absorption. Optical glass in general, such as BK-7 (borosilicate crown glass) or the like, can be used as the glass. A crystal of $LiNbO_3$, $LiTaO_3$, $LiCaO_3$, $BaTiO_3$, $Al_2O_3$, $Ga_2O_3$, $Y_2O_3$, $Y_3Al_5O_{12}$, $Lu_3Al_5O_{12}$, $ScAlMgO_4$, or the like can be used as the oxide. The material 140 is preferably $MgF_2$, $CaF_2$, or $LiNbO_3$. These materials have a high transmittance and birefringence, and are good for use as the resonator material.

The resonator 11 is machined by pressing a diamond knife against the lateral surface 131 of the material 140 having the circular column shape with a diameter L1, while rotating the circular column material 140 around a center axis. The resonator 11 having the light circulating surface 111 can be machined with a high accuracy, by controlling a rotational speed of the material 140 and a pressure of the diamond knife to control a griding amount d from the lateral surface 131 of the circular column shape. The griding amount d to the light circulating surface 111 is 400 nm or more and 3100 nm or less, and preferably 600 nm or more and 2100 nm or less, for example.

Portions of the material 140 that are not ground and remain become the first support portion 13*a* and the second support portion 13*b* of the support 15A. Thus, the resonator structure body 150A in which the resonator 11 and the support 15A are monolithically formed is obtained, and the resonator 11 can be more stably supported by the substrate 21 or the like. The lateral surfaces 131 of the circular column of the first support portion 13*a* and the second support portion 13*b* are fixing surfaces with respect to the substrate 21 or the like, as will be described later. The first connecting portion 14*a* that is formed between the resonator 11 and the first support portion 13*a* by the machining is also monolithically formed with the resonator 11 and the first support portion 13*a*. Similarly, the second connecting portion 14*b* that is formed between the resonator 11 and the second support portion 13*b* by the machining is also monolithically formed with the resonator 11 and the second support portion 13*b*. A width of the first connecting portion 14*a*, that is, the distance between the resonator 11 and the first support portion 13*a* is longer than the wavelength of the light circulating in the resonator 11. The same applies to the width of the second connecting portion 14*b*, that is, the distance between the resonator 11 and the second support portion 13*b*. By forming the first connecting portion 14*a* and the second connecting portion 14*b*, a gap is formed between the light circulating surface 111 and the lateral surface of the first support portion 13*a* side of the resonator 11 and a gap is formed between the light circulating surface 111 and the lateral surface of the second support portion 13*b* side of the resonator 11, and thus, the light can be efficiently confined in the resonator 11.

In FIG. 4C, the resonator structure body 150A is fixed to the substrate 21 or the like, such that the light circulating surface 111 of the resonator 11 corresponds to the upper surface of the optical waveguide 23. As described above with reference to FIG. 4A and FIG. 4B, because the height h of the ridge 231 of the optical waveguide 23 and the grinding amount d from the lateral surface 131 of the material 140 are accurately controlled, when the resonator structure body 150A is placed on the substrate 21 or the like, the distance G between the upper surface of the ridge 231 and the light circulating surface 111 is determined in an assembling stage by self-alignment. For example, when the grinding amount d is 1100 nm and the height h is 1000 nm, the distance G is approximately 100 nm.

Because the distance G is accurately controlled, a stable optical coupling can be achieved between the resonator 11 and the optical waveguide 23. The first gap 51 (refer to FIG. 1A) is provided between the resonator 11 and the optical waveguide 23, and is highly stable with respect to the temperature change, vibration, or the like because no material, such as an adhesive or the like, is interposed therebetween.

Figure 5:
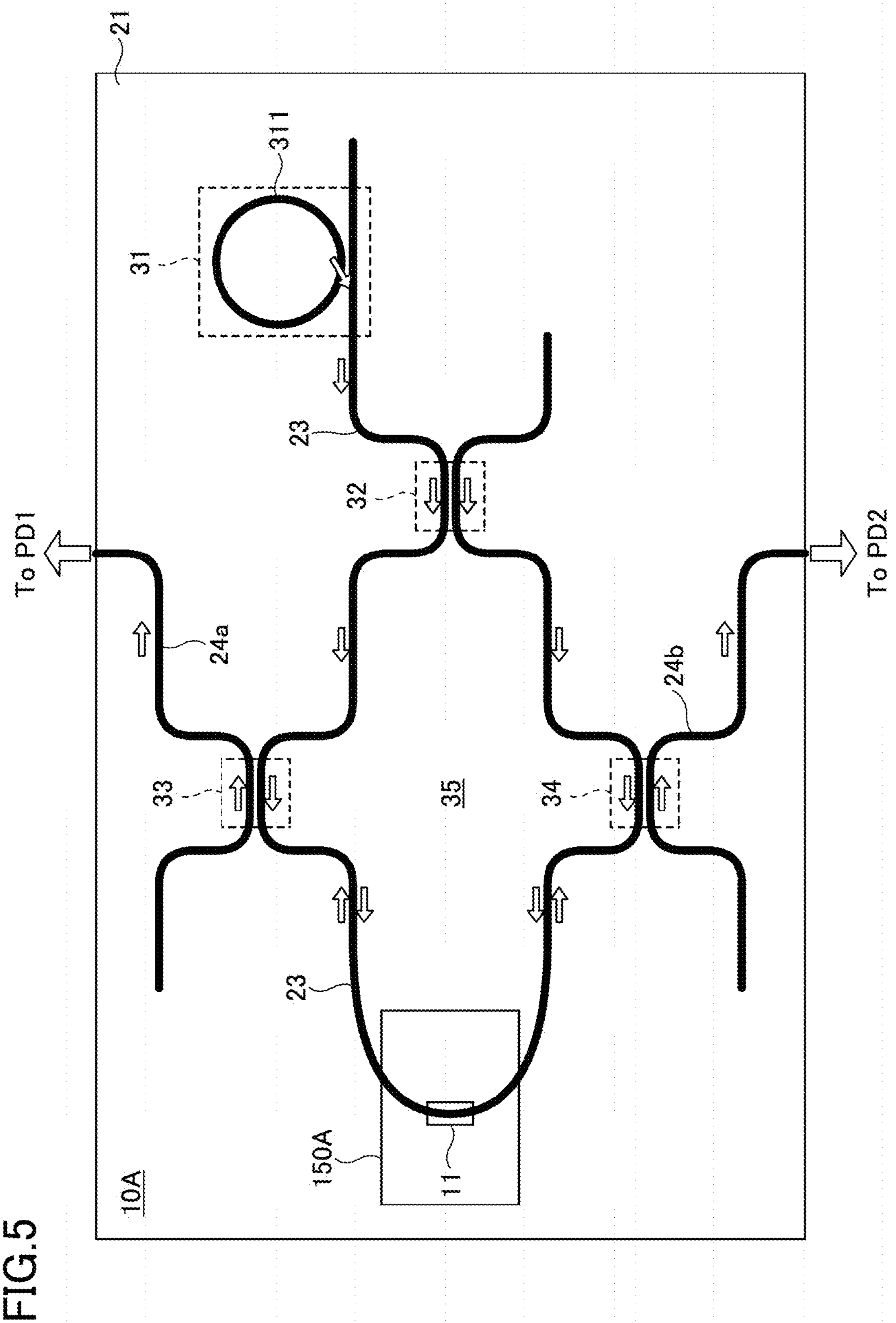
FIG. 5 is a schematic plan view illustrating a first configuration example of the optical circuit.
Figure 6:
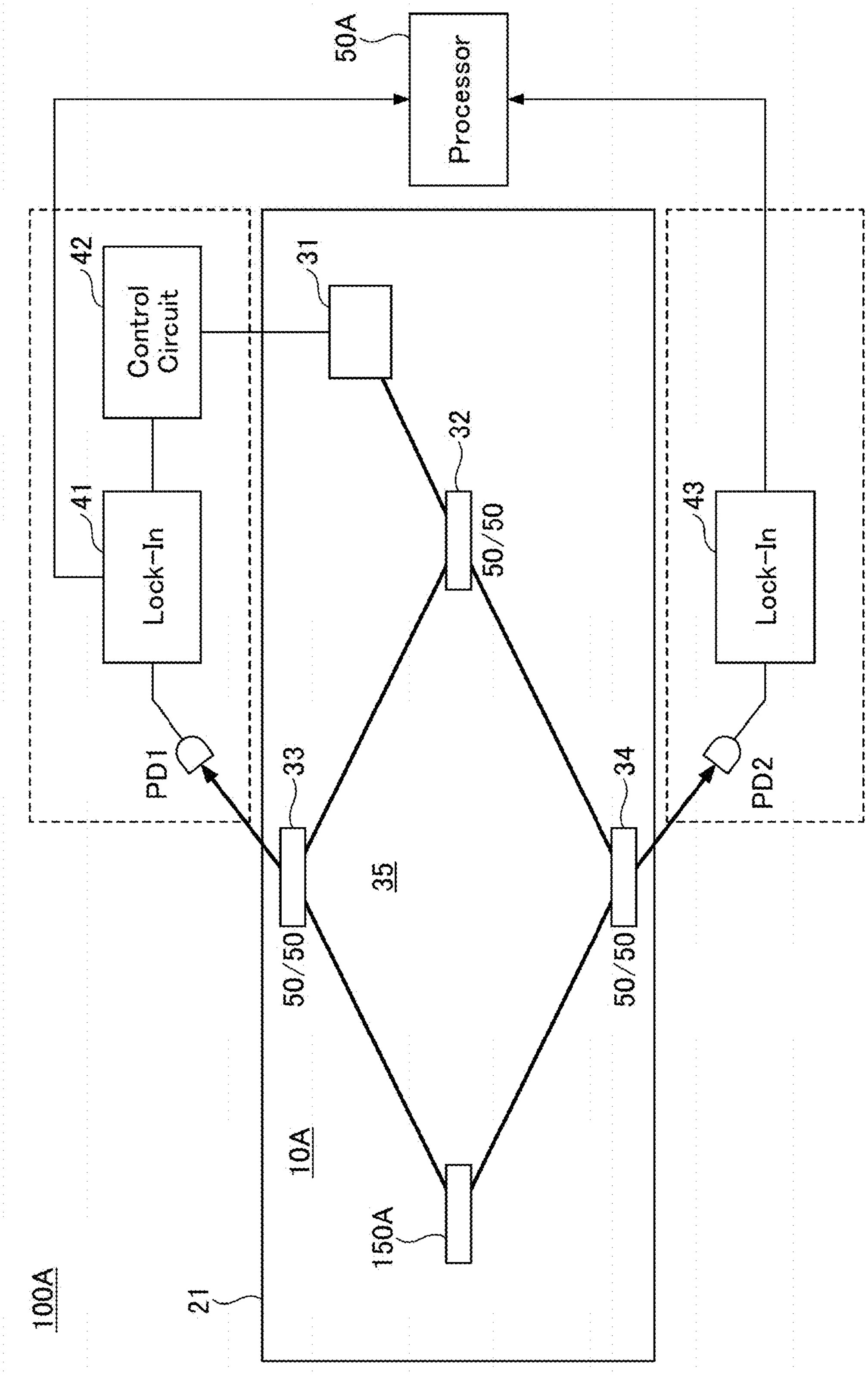
FIG. 6 is a schematic diagram of an optical sensor using the optical circuit of FIG. 5.

FIG. 5 is a schematic plan view illustrating a configuration example of an optical circuit 10A in which the resonator structure body 150A is disposed, and FIG. 6 is a schematic diagram of an optical sensor 100A to which the optical circuit 10A is applied. The optical circuit 10A includes the light source 31, the optical waveguide 23, the resonator structure body 150A including the resonator 11, a first output waveguide 24*a*, and a second output waveguide 24*b*. The optical sensor 100A includes the optical circuit 10A, photodetectors PD1 and PD2 for detecting light having circulated in the resonator 11, and a processor for processing photodetector outputs. The optical sensor 100 is a gyro sensor, for example.

The light source 31 is a ring laser formed by a ring waveguide 311, for example, provided on the substrate 21 or the like. The ring waveguide 311 may be formed of the optical waveguide described with reference to FIG. 2B. The light source 31 outputs light having a peak wavelength 200 nm or more and 1600 nm or less, for example. The light source 31 may output light having a peak wavelength 200 nm or more and 550 nm or less, for example. By using light having a relatively short wavelength, a change in phase due to the Sagnac effect can be made large, and a sensor sensitivity can be improved. In addition, the light source 31 may output light having a peak wavelength 630 nm or more and 1560 nm or less, for example. By using light having a relatively long wavelength, the distance for optically coupling the light source 31 and the optical waveguide 23 and the distance for optically coupling the optical waveguide 23 and the resonator 11 can be made large. In this case, the fabrication of the optical circuit 10A and the optical sensor 100A is facilitated. Further, the optical Kerr effect of the resonator 11, which will be described later, can be reduced. It is preferable that the light source 31 outputs light having a single wavelength. In this case, noise of the optical sensor can be reduced.

The ring waveguide 311 is preferably a waveguide that satisfies a single mode condition. Because a transverse mode is the fundamental mode, it is easy to control the light propagating through the optical waveguide 23. When the ring waveguide 311 satisfies the single mode condition, a width of the ring waveguide 311 may be 0.3 μm or more and 2 μm or less, for example. By injecting a current from an electrode provided on the ring waveguide 311, light is generated in the active layer in the waveguide and amplified. A distance between the ring waveguide 311 forming the ring laser and the optical waveguide 23 is shorter than the distance at which the evanescent wave leaks. Accordingly, the ring waveguide 311 and the optical waveguide 23 are optically coupled, and light is output from the light source 31 to the optical waveguide 23.

The optical waveguide 23 may be a waveguide having the same configuration as the ring waveguide 311, or may be a thin wire waveguide formed of $SiO_2$ or the like described with reference to FIG. 2A. The optical waveguide 23 and the ring waveguide 311 of the light source 31 are preferably formed of the same group III-V compound semiconductor. For example, the optical waveguide 23 and the ring waveguide 311 of the light source 31 can be formed by performing a process on the substrate 21B or the like including the substrate 211, the n-side semiconductor layer 213, the active layer 214, and the p-side semiconductor layer 215 in this order, by using photolithography and/or electron beam lithography or the like, so as to form the optical waveguide 23 and the ring waveguide 311 of the light source 31. The optical waveguide 23 and the ring waveguide 311 of the light source 31 can be formed by removing the substrate 21B or the like from the p-side semiconductor layer 215 to a portion of the n-side semiconductor layer 213 by photolithography and/or electron beam lithography. Because the group III-V compound semiconductor emits light when applied with a current, an external light source is not required. Hence, it is possible to reduce the size of the optical circuit 10A. Further, a strength of the optical coupling between the light source 31 and the optical waveguide 23 can be stabilized.

The optical waveguide 23 includes an optical coupler 32 having a branching ratio of 50:50. The optical coupler 32 is formed by a part of the optical waveguide 23 and another part of the optical waveguide 23. In the present specification, a part of the optical waveguide 23 optically coupled by the optical coupler 32, another part of the optical waveguide 23, and the optical waveguide 23 existing therebetween are collectively referred to as a loop 35. The light output from the light source 31 is branched by the optical coupler 32 at an intensity ratio of 50:50. The optical coupler 32 may be a directional coupler or a Y-branch waveguide, for example. One of the branched lights passes through the loop 35 in a counterclockwise direction, and circulates in the counterclockwise direction in the resonator 11. The other of the branched lights passes through the loop 35 in a clockwise direction, and circulates in the clockwise direction in the resonator 11. When the optical sensor 100A is rotated, an optical path length sensed by the light circulating in the resonator 11 changes depending on a rotation angle or an angular velocity of the substrate 21 or the like. Hence, the resonance frequency of the resonator 11 with respect to the light circulating in the clockwise direction, and the resonance frequency of the resonator 11 with respect to the light circulating in the counterclockwise direction vary (Sagnac effect). The angular velocity can be calculated from a difference between the resonant frequency of the resonator 11 with respect to the light circulating in the clockwise direction and the resonant frequency of the resonator 11 with respect to the light circulating in the counterclockwise direction.

The optical circuit 10A includes optical couplers 33 and 34 at intermediate points of the loop 35. The optical coupler 33 is formed by a part of the optical waveguide 23 and a part of the first output waveguide 24*a*. The optical coupler 34 is formed by a part of the optical waveguide 23 and a part of the second output waveguide 24*b*. As illustrated in FIG. 5, in the plan view, the optical couplers 33 and 34 are disposed on one side and the other side of the loop 35 via the resonator structure body 150A, respectively. The optical couplers 33 and 34 have a branching ratio of 50:50, for example, and may be directional couplers. A part of the light having circulated in the clockwise direction in the resonator 11 is guided to the first output waveguide 24*a* by the optical coupler 33, and detected by the first photodetector (designated by "PD1" in FIG. 6). A part of the light circulating in the counterclockwise direction in the resonator 11 is guided to the second output waveguide 24*b* by the optical coupler 34, and is detected by the second photodetector (designated by "PD2" in FIG. 6).

As illustrated in FIG. 6, the intensity of the light detected by the first photodetector (PD1) is measured by a lock-in amplifier 41. The measurement result of the lock-in amplifier 41 is fed back to the light source 31 via a control circuit 42, and is also input to a processor 50A. The wavelength of light from the light source 31 is controlled based on the feedback from the control circuit 42. For example, a Proportional-Integral-Differential (PID) control circuit can be used as the control circuit 42.

The intensity of the light detected by the second photodetector (PD2) is measured by a lock-in amplifier 43. The measurement result of the lock-in amplifier 43 is input to the processor 50A. The processor 50A processes the signal input thereto. More particularly, the processor 50A calculates and outputs the angular velocity from a difference between the output of the lock-in amplifier 41, that is, the detection result of the first photodetector (PD1), and the output of the lock-in amplifier 43, that is, the detection result of the second photodetector (PD2). This means that a deviation amount of the detected amount of the PD1 is measured with reference to the detected amount of the PD2, for example. From this difference, it is possible to obtain and output the angular velocity received by the optical sensor 100A.

Fixing Resonator Structure Body

In a case where the optical circuit 10A is applied to the optical sensor 100A for measuring the angular velocity, it is important that an optical response does not vary due to factors other than the angular velocity. That is, it is important how the resonator 11 is stably held while maintaining the distance G between the resonator 11 and the upper surface of the optical waveguide 23.

Figure 7:
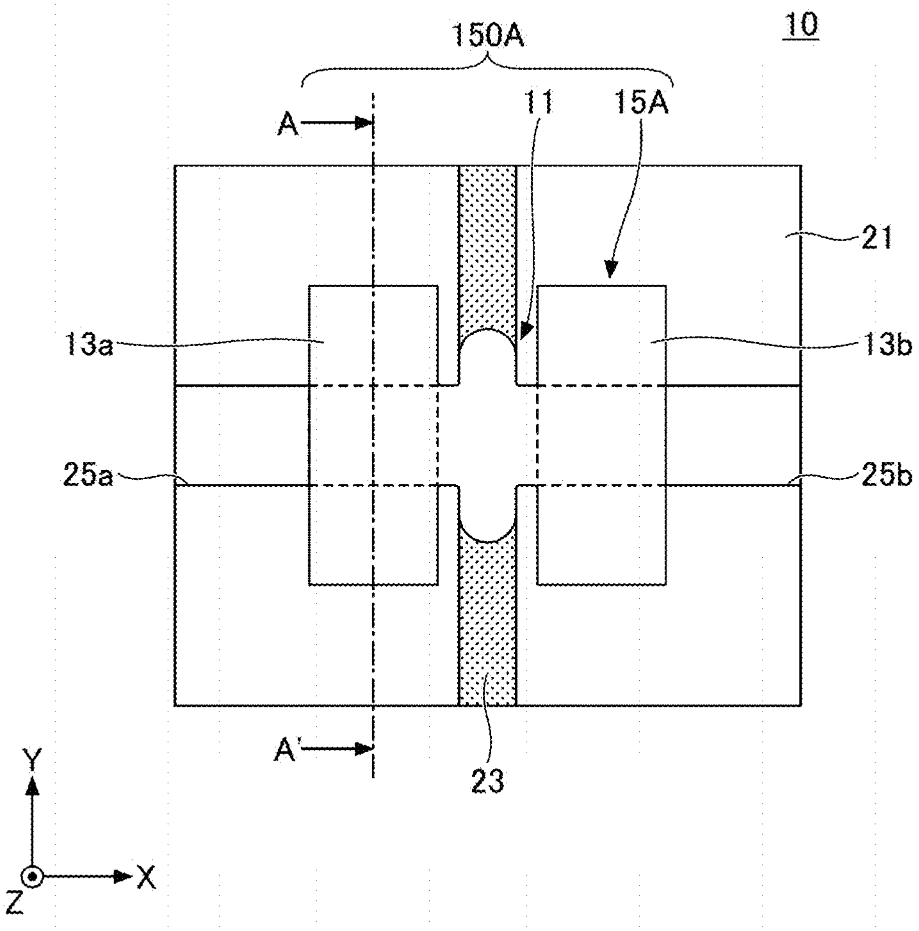
FIG. 7 is a top view illustrating fixing of the resonator structure body.
Figure 8:
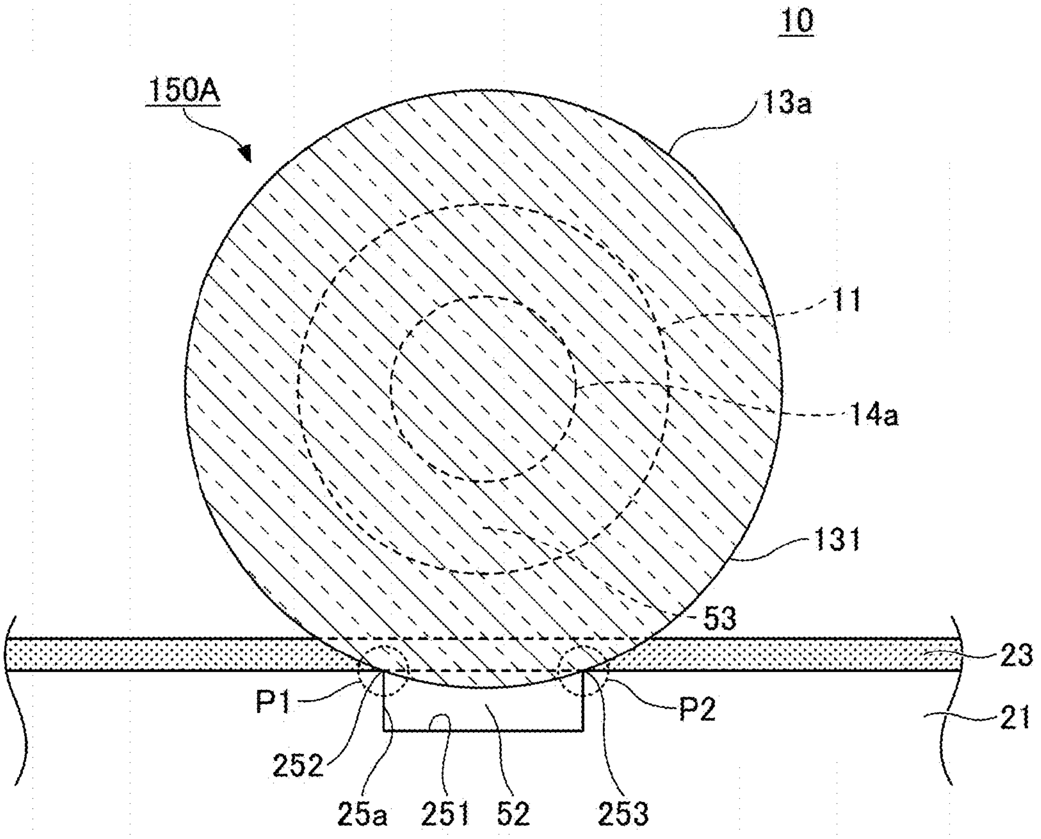
FIG. 8 is a cross sectional view taken along a line A-A' in FIG. 7.

FIG. 7 and FIG. 8 are diagrams illustrating the fixing of the resonator structure body 150A to the substrate 21 or the like. FIG. 7 is a top view, and FIG. 8 is a cross sectional view taken along a line A-A' in FIG. 7. FIG. 8 is a vertical cross section of the first support portion 13*a* viewed in the optical axis direction (X direction) of the optical waveguide 23, but a vertical cross section of the second support portion 13*b* viewed in the −X direction is also the same as the vertical cross section of the first support portion 13*a*.

In the example of FIG. 7 and FIG. 8, the first support portion 13*a* and the second support portion 13*b* have a circular column shape. A first groove 25*a* and a second groove 25*b* extending in a direction (for example, the ±X direction) different from the optical axis of the ridge 231 (refer to FIG. 1A) of the optical waveguide 23 are formed in the substrate 21 or the like. A width of the first groove 25*a* and the second groove 25*b* in the optical axis direction of the optical waveguide 23 formed between the first groove 25*a* and the second groove 25*b* is smaller than the maximum length of the first support portion 13*a* and the second support portion 13*b*, and may be 0.8 times or less, 0.6 times or less, or 0.4 times or less than the maximum length. As illustrated in FIG. 8, the lateral surface 131 of the first support portion 13*a* of the support 15A is in contact with edges 252 and 253 at an upper end of the first groove 25*a*. A second gap 52 is provided between a bottom surface 251 of the first groove 25*a* and the first support portion 13*a*.

Contact positions between the lateral surface 131 and the edges 252 and 253 are designated by P1 and P2. The first support portion 13*a* is not in contact with the substrate 21 or the like and the first groove 25*a* at positions other than the positions P1 and P2. As described above, the second gap 52 is formed between the lateral surface 131 of the first support portion 13*a* and the bottom surface 251 of the first groove 25*a*. A third gap 53 is formed between the first connecting portion 14*a* and the substrate 21 or the like. Even when the first groove 25*a* is provided, the distance G is maintained such that the optical waveguide 23 and the resonator 11 are optically coupled.

The second support portion 13*b* of the support 15A also has the same positional relationship as the first support portion 13*a* with respect to the substrate 21 or the like and the second groove 25*b*. That is, the lateral surface 131 of the second support portion 13*b* is in contact with the edges 252 and 253 of the second groove 25*b* at the upper end of the second groove 25*b*. The second gap 52 is formed between the lateral surface 131 of the second support portion 13*b* and the bottom surface 251 of the second groove 25*b*, and the third gap 53 is formed between the second connecting portion 14*b* and the substrate 21 or the like. Hereinafter, the first groove 25*a* and the second groove 25*b* may be referred to as "grooves 25" when not distinguishing the two from each other.

In FIG. 8, the first gap 51 is formed between the resonator 11 and the optical waveguide 23, the second gap 52 is formed between the resonator structure body 150A and the first groove 25*a*, and the third gap 53 is formed between the first connecting portion 14*a* and the substrate 21 or the like. The resonator structure body 150A is supported by the edges 252 and 253 at the upper end of the first groove 25*a*, in a state where the resonator 11 is supported above the optical waveguide 23 with a space therebetween. At the second groove 25*b*, the resonator structure body 150A is similarly in contact with the substrate 21 or the like only at two points at the positions P1 and P2. Thus, the entire resonator structure body 150A is less likely to be affected by temperature changes and vibrations.

As illustrated in FIG. 7 and FIG. 8 and described above, by supporting the first support portion 13*a* and the second support portion 13*b* of the resonator structure body 150A by the edges at the upper ends of the first groove 25*a* and the second groove 25*b*, respectively, it is possible to stabilize the distance G between the upper surface of the ridge 231 and the light circulating surface 111. The distance G is less than or equal to the wavelength of the light in vacuum propagating through the optical waveguide 23. The distance G may be 700 nm or less, 500 nm or less, 300 nm or less, 100 nm or less, 90 nm or less, 80 nm or less, or 70 nm or less, for example.

Figure 9:
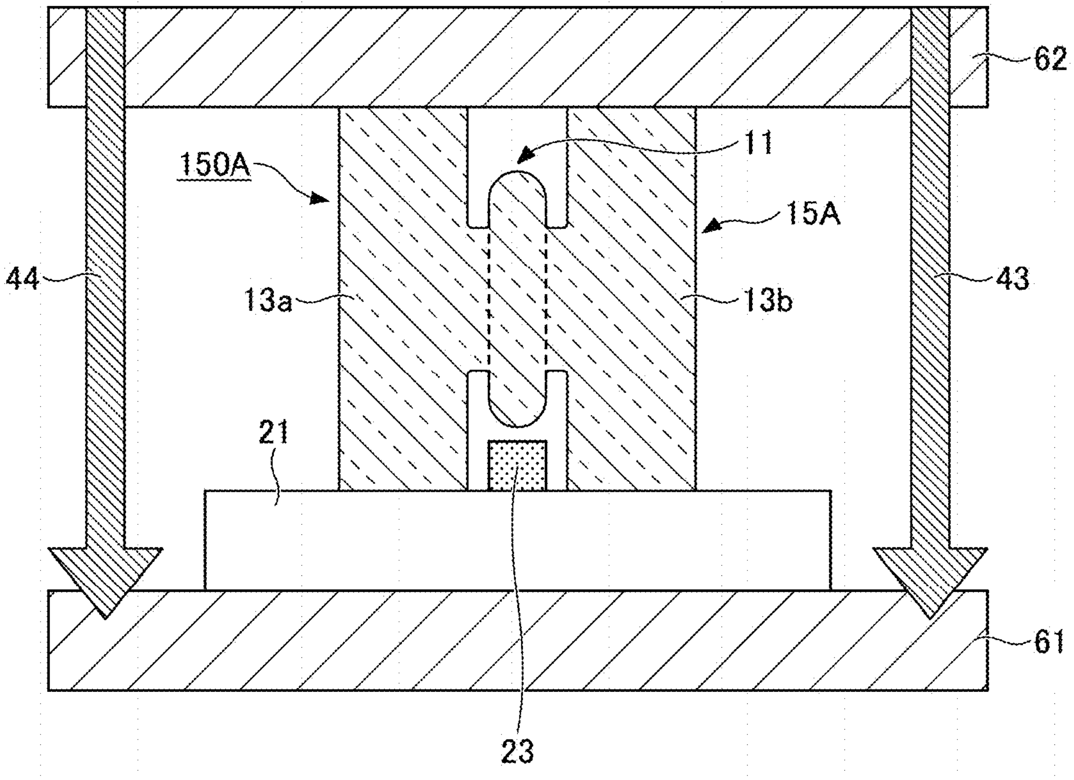
FIG. 9 is a schematic diagram illustrating an example of a method of fixing the resonator structure body.

FIG. 9 illustrates an example of a method of fixing the resonator structure body 150A. The substrate 21 or the like on which the resonator structure body 150A is mounted may be interposed between plates 61 and 62 from above and below. The plates 61 and 62 can be formed of brass or copper, for example. The plates 61 and 62 may be dielectric substrates with a thermal expansion coefficient having a small difference from those of the substrate 21 or the like and/or the resonator structure body 150A. In this case, it is possible to suppress the detachment of the substrate 21 or the like from the plate 61, or the detachment of the resonator structure body 150A and the plate 62, caused by temperature changes, and fix the resonator structure body 150A. The plates 61 and 62 may be tightened with screws 43 and 44, to make a firm contact between the lateral surface 131 of the support 15A and the edges 252 and 253 of the groove 25 (refer to FIG. 8) at the positions P1 and P2. The resonator structure body 150A may be fixed between the plates 61 and 62 by a clamp or the like, in place of using the screws 43 and 44.

Prior to the clamping by the screws 43 and 44, the clamp, or the like, a part of the resonator structure body 150A may be temporarily fixed to the substrate 21 or the like in a region excluding the groove 25 and the optical waveguide 23. When performing the temporary fixing with the use of an adhesive, the temporary fixing is desirably made using an adhesive that can easily be removed, at a position that does not affect the optical coupling between the resonator structure body 150A and the substrate 21 or the like.

By the fixing method of FIG. 9, the distance between the resonator 11 and the optical waveguide 23 is maintained constant, and the optical coupling can be stabilized.

Utilization of Higher-Order Mode

When the resonator 11 having the light circulating surface 111 is used, the light circulates along the light circulating surface 111 many times, and thus, the intensity of light intensified interference increases. When the intensity of light is high, the optical Kerr effect occurs in which the refractive index varies according to the light intensity. A variation in the optical path length of the resonator 11 caused by the optical Kerr effect, and the difference in the optical path length of the gyro sensor caused by the angular velocity, cannot be distinguished from each other and become noise. Accordingly, when the optical Kerr effect is taken into consideration, it is difficult to increase the power of light, and the sensitivity may become limited.

In order to solve this problem, it is conceivable to selectively utilize a mode of a high order (hereinafter also referred to as a "higher-order mode") of the transverse mode of the resonator. An electric field intensity distribution of the higher-order mode includes many antinodes and nodes and is widely distributed compared to an electric field intensity distribution of the fundamental mode. Accordingly, by utilizing the higher-order mode, the intensity per unit area of light coupled to the resonator 11 can be reduced in the resonator 11. Hence, it possible to reduce noise caused by the optical Kerr effect and improve the sensitivity, while increasing the intensity of light amplified in the resonator 11.

Figure 10:
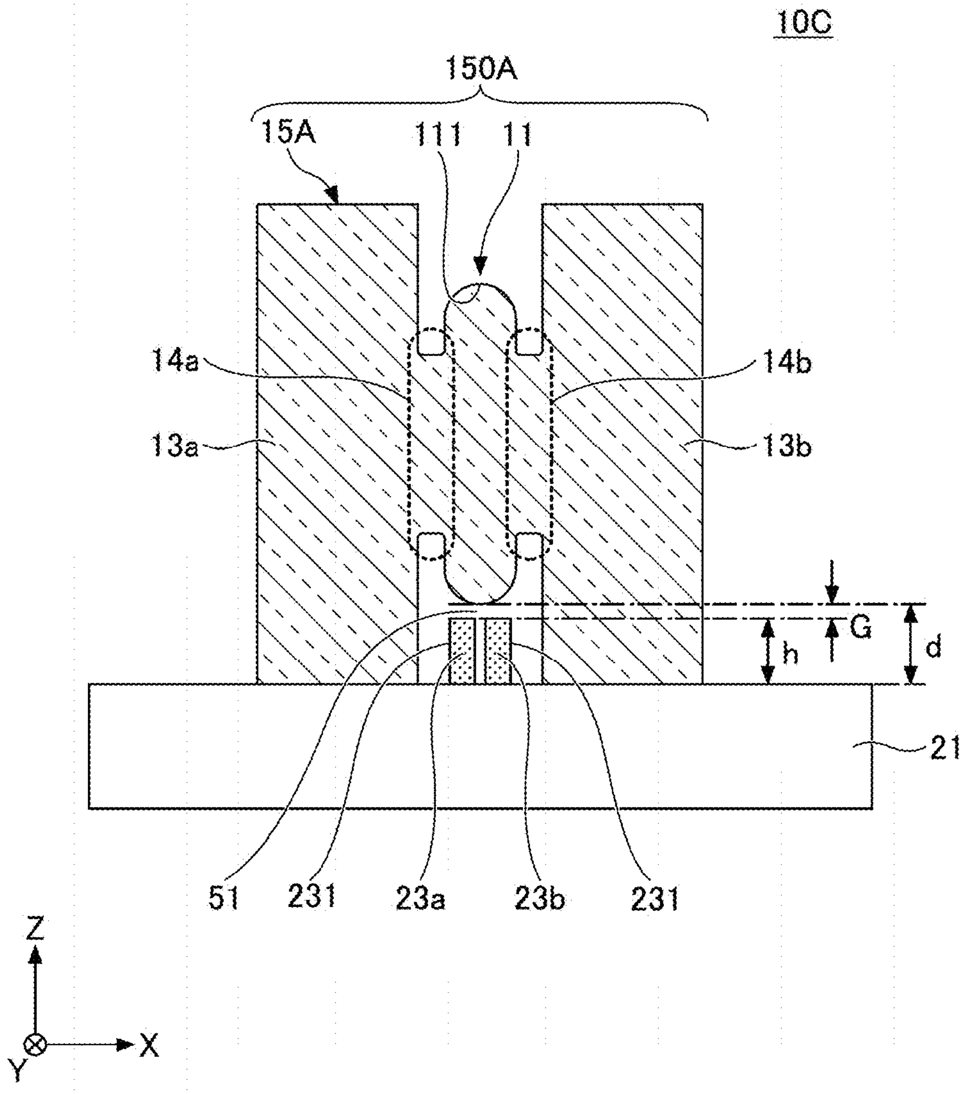
FIG. 10 is a schematic diagram of the optical circuit utilizing a higher-order mode in the waveguide direction.

FIG. 10 is a schematic diagram of an optical circuit 10C utilizing the higher-order mode in the waveguide direction. In order to selectively utilize the higher-order mode, an optical waveguide including two or more ridges is used. Optical waveguides 23*a* and 23*b* respectively including the ridges 231 are arranged side by side on the substrate 21 or the like. Preferably, the optical waveguides 23*a* and 23*b* are arranged such that the upper surfaces of the ridges 231 face a position where the higher-order mode is generated on the light circulating surface 111 of the resonator 11. Hence, it is possible to efficiently couple the higher-order mode of the resonator 11 and the transverse mode of the optical waveguides 23*a* and 23*b*.

For example, the optical waveguides 23*a* and 23*b*satisfy the single mode condition, respectively. Because the electric field intensity distribution of the fundamental mode is unimodal, it is easy to optically couple the fundamental mode with the higher-order mode of the resonator 11 having a plurality of antinodes in the electric field intensity distribution. Widths of the optical waveguides 23*a* and 23*b* satisfying the single mode condition may be 0.3 μm or more and 5 μm or less, for example. The ring waveguide 311 of the light source 31 preferably satisfies the single mode condition. That is, the transverse mode of the light generated at the light source 31 is preferably the fundamental mode. In this case, it is easy to control a ratio of the light intensities in the optical waveguides 23*a* and 23*b*, and to optically couple the optical waveguides 23*a* and 23*b* and the resonator 11 efficiently.

The distance G between the upper surface of the ridge 231 of the optical waveguides 23*a* and 23*b* and the resonator 11 is accurately controlled by the machining accuracy of the optical waveguides 23*a* and 23*b* and the machining accuracy of the resonator structure body 150A. The resonator structure body 150A has the same as or similar to structure body as that illustrated in FIG. 1A, and the same constituent elements are designated by the same reference numerals, and a redundant description thereof will be omitted.

Figure 11A:
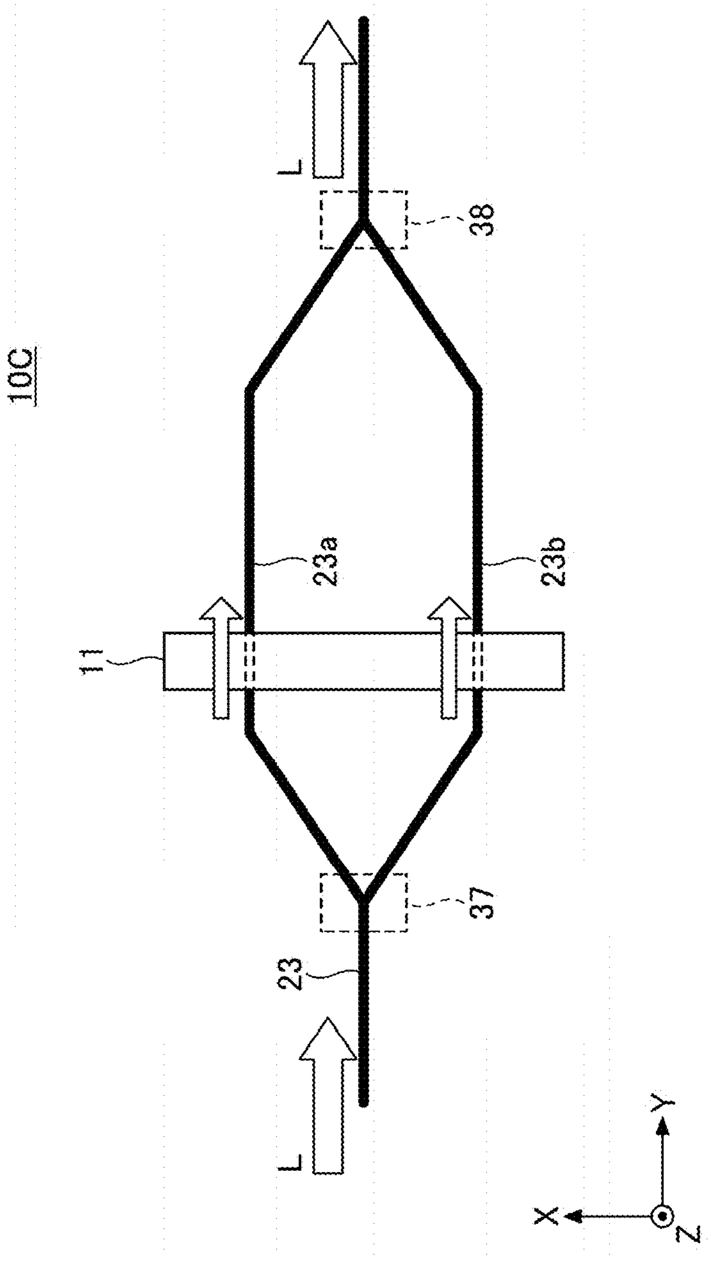
FIG. 11A is a top view of the optical circuit of FIG. 13.

FIG. 11A is a schematic plan view of the optical circuit 10C. The optical waveguide 23 includes a first mode converter 37 that divides the ridge 231 into a plurality of ridges, and a second mode converter 38 that connects the plurality of ridges to one ridge. FIG. 11A illustrates an example of a case where the ridge is divided into two ridges. A part of the light circulating surface 111 of the resonator 11 faces the plurality of ridges divided by the first mode converter 37 via the first gap 51. The first mode converter 37 converts the mode, and the second mode converter 38 couples the converted modes. The first mode converter 37 and the second mode converter 38 may be configured by a Y-branch waveguide that branches one waveguide into two, or may be configured by an optical coupler, a Multi-Mode Interference (MMI) coupler, or the like having a branching ratio of 50:50.

The two mode-converted lights respectively propagate through the optical waveguides 23*a* and 23*b*, and are optically coupled at a position where the higher-order mode of the resonator 11 is generated. Because an area where the lights of the two transverse modes coupled to the resonator 11 is distributed on the light circulating surface 111 is large and the intensity per unit area can be reduced, the noise caused by the optical Kerr effect can be reduced while increasing the intensity of the light amplified in the resonator 11. Between the first mode converter 37 and the second mode converter 38, the two optical waveguides 23*a* and 23*b* preferably have optical path lengths designed to achieve phase matching.

Figure 11B:
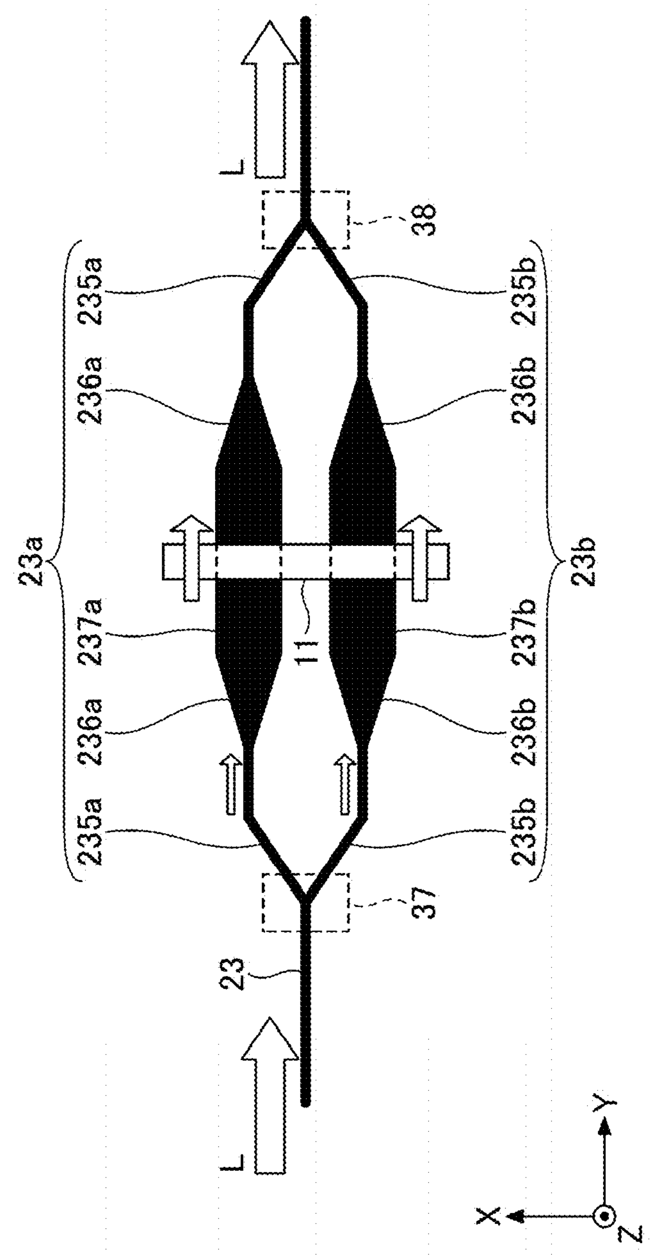
FIG. 11B is a top view of a modification of the optical circuit of FIG. 13.

FIG. 11B is a schematic plan view of a modification of the optical circuit 10C. Only the differences from FIG. 11A will be described. The optical waveguides 23*a* and 23*b* form tapered waveguides. The optical waveguide 23*a* includes two narrow portions 235*a*, two tapered portions 236*a*, and a wide portion 237*a*. The two tapered portions 236*a* and the wide portion 237*a* are provided between the two narrow portions 235*a*. In addition, the wide portion 237*a* is provided between the two tapered portions 236*a*. A waveguide width of the wide portion 237*a* is wider than a waveguide width of the narrow portions 235*a*, and may be 2 times or more and 35 times or less the waveguide width of the narrow portions 235*a*, for example. The waveguide width of the narrow portions 235*a* may be 0.3 μm or more and 5 μm or less, for example. The waveguide width of the wide portion 237*a* is wider than the waveguide width of the narrow portions 235*a*, and may be 1 μm or more and 10 μm or less, for example. Each of the tapered portions 236*a* is formed such that the waveguide width increases from the narrow portion 235*a* toward the wide portion 237*a*. In the wide portion 237*a*, the optical waveguide 23*a* and the resonator 11 face each other. By forming such a tapered waveguide, the width of the mode can be increased while maintaining the mode converted by the first mode converter 37 as the fundamental mode. Because the area of optical coupling with the resonator 11 can be increased, it is possible to reduce the noise caused by the optical Kerr effect. Similarly, the optical waveguide 23*b* includes two narrow portions 235*b*, two tapered portions 236*b*, and a wide portion 237*b*. Other configurations are the same as those of the optical waveguide 23*a* forming the tapered waveguide.

The number of the ridges 231 including the optical waveguide 23 may be increased according to the order of the transverse mode of the resonator 11. As described above, each optical waveguide 23 opposing the resonator 11 may be formed to satisfy the single mode condition. For example, in a case where a third order transverse mode is utilized, the optical waveguide 23 may be divided into four using a 1:4 MMI coupler or the like. In this case, at least two ridges among the plurality of ridges 231 preferably face the position where the higher-order transverse mode of the resonator 11 is generated.

Second Embodiment

Figure 12:
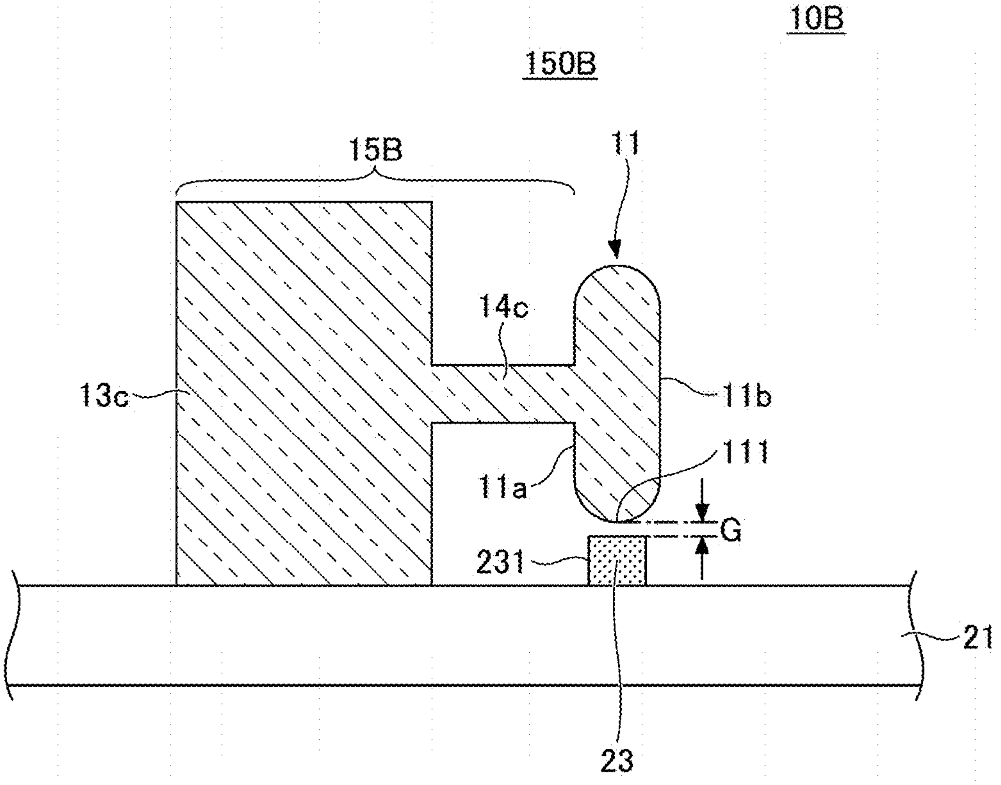
FIG. 12 is a schematic diagram illustrating a second configuration example of the optical circuit using the resonator structure body.
Figure 13:
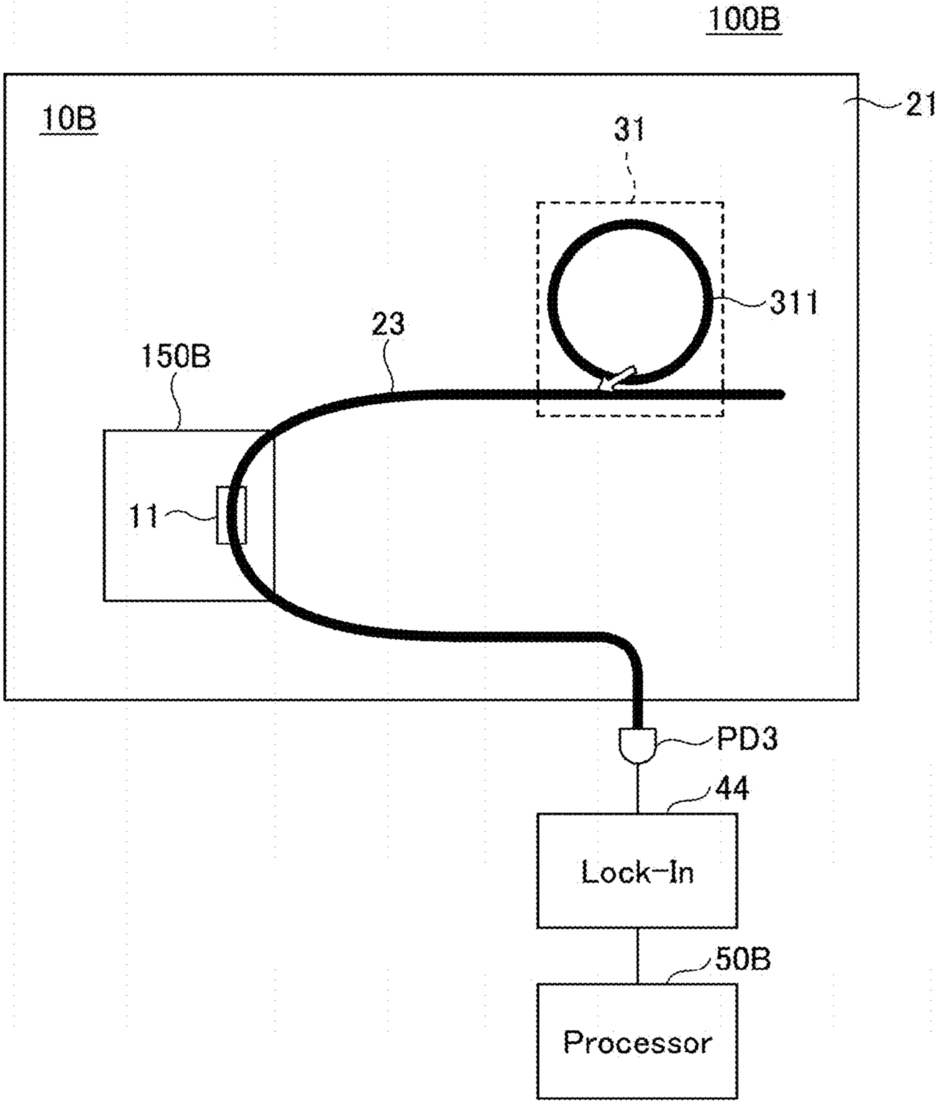
FIG. 13 is a schematic diagram of the optical sensor using the optical circuit of FIG. 12.

FIG. 12 illustrates a configuration example of an optical circuit 10B using ae resonator structure body 150B. FIG. 13 is a schematic diagram of an optical sensor using the optical circuit 10B. An optical sensor 100B is an acceleration sensor, for example.

The resonator structure body 150B used in the optical circuit 10B includes the resonator 11 having the light circulating surface 111, and a support 15B. The support 15B has a support portion 13*c* that supports only one of the first surface 11*a* and the second surface 11*b* of the resonator 11. In this example, the support portion 13*c* is connected to the first surface 11*a* of the resonator 11 by a connecting portion 14*c*.

The resonator structure body 150B can be fabricated by machining with a high accuracy, by controlling the rotational speed of the material 140 and the pressure of the diamond knife, as described with reference to FIG. 4B. In the present embodiment, the resonator 11 is supported by the support portion 13*c* via the connecting portion 14*c*, such that the light circulating surface 111 of the resonator 11 faces the upper surface of the ridge 231 of the optical waveguide 23. The support portion 13*c* has a circular column shape, for example.

As described with reference to FIG. 7 and FIG. 8, the support portion 13*c* is supported at two points at the positions P1 and P2, with respect to the edges 252 and 253 at the upper end of the groove 25 formed in the substrate 21 or the like. For example, the circular column shaped support portion 13*c* is supported by the groove 25.

The groove 25 extends in a direction (for example, in the direction separating from the optical axis) different from the optical axis of the optical waveguide 23 or the ridge 231. A lateral surface of the support portion 13*c* is in contact with the edges 252 and 253 at the upper end of the groove 25, the second gap 52 (refer to FIG. 8) is formed between the support portion 13*c* and the bottom surface of the groove 25, and the third gap 53 (refer to FIG. 8) is formed between the substrate 21 or the like and the support portion 13*c*. Thus, because the optical circuit 10B is less likely to be affected by temperature changes and vibrations, a variation in the optical response caused by factors other than an acceleration can be reduced. The fixing of the resonator structure body 150B with respect to the edges 252 and 253 of the groove 25 may also be reinforced by screws, clamps, or the like.

In the resonator structure body 150B, the resonator 11 having a mass smaller than that of the support portion 13*c* is held by the elongated connecting portion 14*c* like a cantilever. That is, one end of the resonator 11 is fixed to the support 15B, and the other end on the opposite side of the resonator 11 is free. For example, a maximum length of the connecting portion 14*c* is smaller than the maximum length of the resonator 11 in the normal direction to the substrate 21 or the like. Moreover, a distance between the support portion 13*c* and the resonator 11 is greater than the maximum length of the connecting portion 14*c*. In the optical circuit 10B, the distance G between the light circulating surface 111 of the resonator 11 and the upper surface of the ridge 231 is set to a predetermined design value, by controlling the height of the optical waveguide 23 and the grinding amount of the material 140. In the case where the optical circuit 10B is applied to the acceleration sensor, the distance G varies due to an inertia force caused by the acceleration. The optical sensor 100B can measure the acceleration by reading the variation in the distance G as a variation in the intensity of light.

As illustrated in FIG. 13, the optical circuit 10B includes the light source 31, the optical waveguide 23, and the resonator structure body 150B including the resonator 11. The light source 31 is a single wavelength laser light source formed by the ring waveguide 311, for example. The ring waveguide 311 and the optical waveguide 23 are optically coupled, and the optical waveguide 23 and the resonator 11 are optically coupled. That is, the distance between the ring waveguide 311 and the optical waveguide 23 is shorter than the distance at which the evanescent wave leaks, and the distance between the optical waveguide 23 and the resonator 11 is also shorter than the distance at which the evanescent wave leaks. The light output from the light source 31 propagates through the optical waveguide 23, and the light propagated through the optical waveguide 23 circulates along the light circulating surface 111 of the resonator 11. The circulated light propagates through the optical waveguide 23, and is detected by a photodetector (PD3).

The intensity of the light received by the photodetector (PD3) varies according to the distance G between the light circulating surface 111 of the resonator 11 and the optical waveguide 23, that is, the acceleration to which the optical sensor 100B is subjected to. The intensity of the light detected by the photodetector (PD3) is measured by a lock-in amplifier 44 and input to a processor 50B. The processor 50B calculates and outputs the acceleration from the variation in the intensity of the detected light.

In the optical sensor 100B, the distance G between the upper surface of the optical waveguide 23 and the light circulating surface 111 is accurately set in a state where the optical sensor 100B is not subjected to the acceleration, and the resonator structure body 150B is stably fixed to the substrate 21 or the like. Further, when the resonator 11 is subjected to the acceleration, the resonator 11 moves due to the inertia force caused by the acceleration, and the acceleration can be measured with a high accuracy, because only one of the first surface 11*a* and the second surface 11*b* of the resonator 11 is supported by the support portion 13*c*.

Similar to the first embodiment, the ridge of the optical waveguide 23 of the optical circuit 10B may be divided into a plurality of ridges, and the light circulating surface of the resonator 11 may be configured to face the plurality of ridges via the first gap 51 (refer to FIG. 10). In this case, as illustrated in FIG. 11A and FIG. 11B, the first mode converter 37 for dividing the optical waveguide 23 into the plurality of ridges and the second mode converter 38 for connecting the plurality of ridges to one ridge may be provided. At least two ridges among the plurality of ridges 231 preferably face the position where the higher-order transverse mode of the resonator 11 is generated.

Application Example

For example, information terminals, such as smartphones, tablet terminals, watches, or the like, and mobile bodies, such as drones, vehicles, ships, aircrafts, or the like, can include the optical circuit 10A or 10B or the optical sensor 100A or 100B according to the present disclosure. For example, in the case of the drone, an inclination of the body can be controlled by providing a gyro sensor as the optical sensor. When an acceleration sensor is provided as the optical sensor, a moving speed can be controlled. Further, in the case of the vehicle, the vehicle provided with a gyro sensor and/or an acceleration sensor as the optical sensor can form part of a driving assistance system.

The optical circuit 10A or 10B or the optical sensor 100A or 100B according to the present disclosure can be used for a driving support system of the mobile body, for example. The optical sensors 100A and 100B according to the present disclosure have few operating parts and thus are highly robust, and can be suitably used for the mobile body requiring safety.

Figure 14:
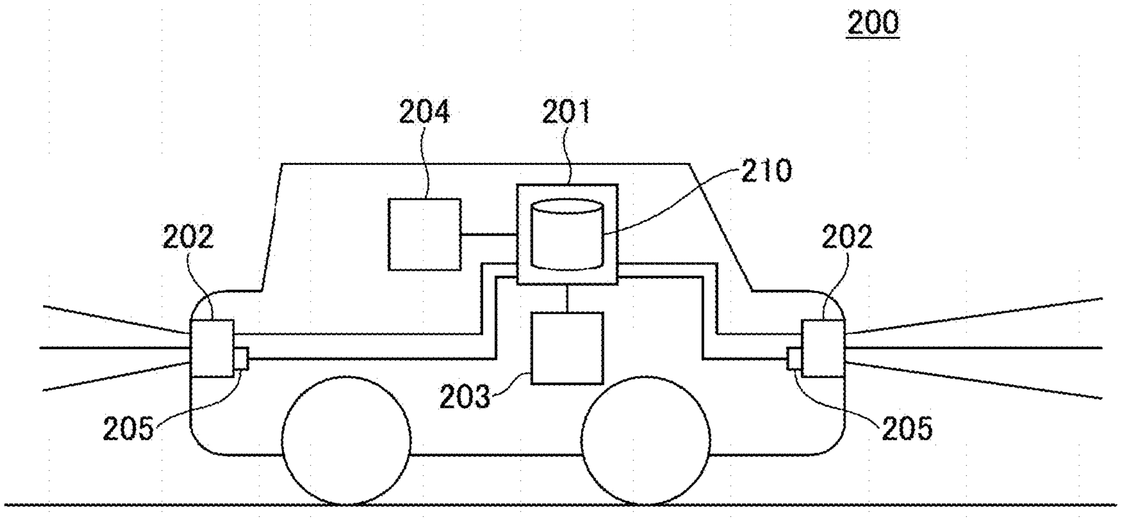
FIG. 14 is a schematic diagram of a mobile body having the optical circuit or the optical sensor according to the embodiment.

FIG. 14 is a schematic diagram of a driving support system installed in a mobile body 200, such as a vehicle or the like. The driving support system illustrated in FIG. 14 includes an in-vehicle device 201 that is provided in the vehicle and performs a control related to driving support of the vehicle, a LiDAR 202, a gyro sensor 203, a vehicle body acceleration sensor 204, and a LiDAR acceleration sensor 205.

The in-vehicle device 201 is electrically connected to the LiDAR 202, the gyro sensor 203, the vehicle body acceleration sensor 204, and the LiDAR acceleration sensor 205, and acquires output data from these constituent elements. In addition, the in-vehicle device 201 stores a map Data Base (DB) 210 that stores road data, feature information related to features provided near the roads, or the like. The in-vehicle device 201 estimates a position of the vehicle based on the output data and the map DB 210 described above, and performs a control related to driving support of the vehicle, such as automatic driving control or the like based on the estimated result of the vehicle position. Moreover, the in-vehicle device 201 estimates an orientation and a position of the LiDAR 202, based on the outputs of the LiDAR 202, the gyro sensor 203, the vehicle body acceleration sensor 204, and the LiDAR acceleration sensor 205. The in-vehicle device 201 performs a process for correcting each measurement value of point cloud data output from the LiDAR 202, based on the estimated result of the orientation and position.

The LiDAR 202 emits a pulse laser with respect to a predetermined angular range in a horizontal direction and a vertical direction to discretely measure a distance to an object existing outside, and generates three-dimensional point cloud information indicating the position of the object. In this case, the LiDAR 202 includes an irradiation unit that irradiates the laser light while varying the irradiating direction, a light receiving unit that receives reflected or scattered light of the irradiated laser light, and an output unit that outputs scan data based on a light reception signal output from the light receiving unit. The scan data is generated based on the irradiating direction corresponding to the laser light received by the light receiving unit, and a distance to the object in the irradiating direction of the laser light identified based on the light reception signal described above, and the scan data is supplied to the in-vehicle device 201. In FIG. 14, as an example, the LiDAR 202 is provided at each of a front part and a rear part of the vehicle.

The gyro sensor 203 is provided in the vehicle, and supplies an output signal corresponding to a yaw rate of the vehicle body to the in-vehicle device 201. The gyro sensor 203 is the optical sensor 100A described in the embodiment according to the present disclosure. A plurality of gyro sensors 203 may be provided. For example, the gyro sensor 203 may be provided on each of a front wheel side and a rear wheel side of the vehicle, and each gyro sensor 203 may be electrically connected to the in-vehicle device 201. In this case, it possible to more accurately control a traveling direction of the vehicle.

The vehicle body acceleration sensor 204 is an acceleration sensor provided in the vehicle, and supplies detection signals equivalent to three-axis acceleration data corresponding to the traveling direction, the lateral direction, and the height direction of the vehicle body. The LiDAR acceleration sensor 205 is a three-axis acceleration sensor provided in each LiDAR 202. The sensor supplies detection signals corresponding to three-axis acceleration data of the LiDAR 202 in which the LiDAR acceleration sensor 205 is provided, to the in-vehicle device 201. The vehicle body acceleration sensor 204 and the LiDAR acceleration sensor 205 are the optical sensor 100B described in the embodiment according to the present disclosure. The three-axis acceleration data can be obtained by providing the optical sensor 100B in each axial direction.

Although the present invention is described above based on specific configuration examples, the present invention is not limited to the configuration examples described above. Electrodes may be provided near the optical waveguide 23 and the optical couplers 32, 33, and 34 forming the optical circuit 10, or near the first mode converter 37 and the second mode converter 38 forming the optical circuit 10, and an optical phase, the branching ratio of the mode, or the like may be finely adjusted by applying a voltage. In this case, the electrodes may be formed of a good conductor having a high adhesion with respect to a base. Further, in the example of the application to the gyro sensor or the acceleration sensor, the light source 31 outputs the single wavelength light and the single wavelength light is coupled to the resonator 11, however, the present invention is not limited to this example. Light including a plurality of wavelengths, such as a WDM signal or the like, may be subjected to wavelength separation and optically coupled to the resonator.

This application is based upon and claims priority to Japanese Patent Application No. 2021-194775, filed on Nov. 30, 2021, the entire contents of which are incorporated herein by reference.

DESCRIPTION OF THE REFERENCE NUMERALS

10, 10A, 10B, 10C: Optical circuit
11: Resonator
11*a*: First surface
11*b*: Second surface
111: Light circulating surface
13*a*: First support portion
13*b*: Second support portion
14*a*: First connecting portion
14*b*: Second connecting portion
15A, 15B: Support
21: Substrate or semiconductor layer
23, 23*a*, 23*b*: Optical waveguide
24*a*: First output waveguide
24*b*: Second output waveguide
231: Ridge
25*a*: First groove
25*b*: Second groove
251: Bottom surface
252, 253: Edge
50A, 50B: Processor
51: First gap
52: Second gap
53: Third gap
100A, 100B: Optical sensor
150A, 150B Resonator structure body
200: Mobile body
203: Gyro sensor
204: Vehicle body acceleration sensor
205: LiDAR acceleration sensor

The invention claimed is:

1. An optical circuit comprising:

an optical waveguide including a ridge, the optical waveguide formed on a substrate or a semiconductor layer;

a support fixed to an upper surface of the substrate or the semiconductor layer at a position separated from the ridge; and a resonator supported by the support, wherein:

the resonator has a light circulating surface, and is disposed such that a part of the light circulating surface faces an upper surface of the ridge with a first gap interposed therebetween, a distance between the part of the light circulating surface and the upper surface of the ridge facing the part of the light circulating surface is shorter than a distance at which an evanescent wave leaks, the support includes a first support portion configured to support a first surface side of the resonator via a first connecting portion, and a second support portion configured to support a second surface side of the resonator opposite to the first surface via a second connecting portion, and the first support portion and the second support portion are fixed on the substrate or the semiconductor layer on both sides of the ridge.

2. An optical circuit comprising:

an optical waveguide including a ridge, the optical waveguide formed on a substrate or a semiconductor layer;

a support fixed to an upper surface of the substrate or the semiconductor layer at a position separated from the ridge; and a resonator supported by the support, wherein:

the resonator is a whispering gallery mode resonator, the resonator has a light circulating surface, and is disposed such that a part of the light circulating surface faces an upper surface of the ridge with a first gap interposed therebetween, the support includes a first support portion configured to support a first surface side of the resonator via a first connecting portion, and a second support portion configured to support a second surface side of the resonator opposite to the first surface via a second connecting portion, and the first support portion and the second support portion are fixed on the substrate or the semiconductor layer on both sides of the ridge.

3. The optical circuit as claimed in claim 1, wherein a maximum length of the support is greater than a maximum length of the resonator in a normal direction to the upper surface of the substrate or the semiconductor layer.

4. The optical circuit as claimed in claim 1, wherein the resonator and the support are monolithically formed.

5. The optical circuit as claimed in claim 1, wherein the first support portion and the second support portion each have a circular column shape, a first groove and a second groove extending in a direction different from an optical axis of the ridge are formed in the substrate or the semiconductor layer, and a second gap is provided between a bottom surface of the first groove and the first support portion, and between a bottom surface of the second groove and the second support portion.

6. The optical circuit as claimed in claim 1, wherein the optical waveguide further includes a first mode converter configured to divide the ridge into a plurality of ridges, and a second mode converter configured to connect the plurality of ridges to one ridge, and a part of the light circulating surface of the resonator faces the plurality of ridges via the first gap.

7. The optical circuit as claimed in claim 6, wherein at least two ridges among the plurality of ridges face a position where a higher-order transverse mode of the resonator is generated.

8. The optical circuit as claimed in claim 1, further comprising:

a light source configured to output light having a single wavelength to the optical waveguide.

9. The optical circuit as claimed in claim 8, wherein the light source is a ring laser provided on the substrate or the semiconductor layer, and a distance between the light source and the optical waveguide is shorter than a distance at which an evanescent wave leaks.

10. An optical sensor comprising:

the optical circuit according to claim 1;

a photodetector configured to detect light circulating in the resonator; and a processor configured to process an output of the photodetector.

11. A mobile body comprising the optical circuit according to claim 1.

12. The optical circuit as claimed in claim 2, wherein a maximum length of the support is greater than a maximum length of the resonator in a normal direction to the upper surface of the substrate or the semiconductor layer.

13. The optical circuit as claimed in claim 1, wherein the optical waveguide further includes a first mode converter configured to divide the ridge into a plurality of ridges, and a second mode converter configured to connect the plurality of ridges to one ridge, and a part of the light circulating surface of the resonator faces the plurality of ridges via the first gap.

14. The optical circuit as claimed in claim 1, wherein the first connecting portion protrudes from the first support portion, and the second connecting portion protrudes from the second support portion.

15. The optical circuit as claimed in claim 2, wherein the first connecting portion protrudes from the first support portion, and the second connecting portion protrudes from the second support portion.

* * * * *